United States Patent
Lafrance

(10) Patent No.: US 11,983,665 B2
(45) Date of Patent: May 14, 2024

(54) SYSTEM AND METHOD FOR EXPOSING AND INTEGRATING MULTIPLE SUPPLY CHAIN AND DELIVERY NETWORKS TO OPTIMIZE CAPACITY UTILIZATIONS

(71) Applicant: Clear Destination Inc., Montreal (CA)

(72) Inventor: Christian Lafrance, Montreal (CA)

(73) Assignee: Clear Destination Inc., Montreal (CA)

( * ) Notice: Subject to any disclaimer, the term of this patent is extended or adjusted under 35 U.S.C. 154(b) by 124 days.

(21) Appl. No.: 16/712,523

(22) Filed: Dec. 12, 2019

(65) Prior Publication Data

US 2020/0118079 A1 Apr. 16, 2020

Related U.S. Application Data

(63) Continuation of application No. PCT/CA2018/050810, filed on Jun. 29, 2018.

(60) Provisional application No. 62/527,584, filed on Jun. 30, 2017.

(51) Int. Cl.
*G06Q 10/0835* (2023.01)
*G06Q 10/0631* (2023.01)
*G06Q 10/0833* (2023.01)
*G06Q 10/0837* (2023.01)

(52) U.S. Cl.
CPC . *G06Q 10/08355* (2013.01); *G06Q 10/06312* (2013.01); *G06Q 10/0833* (2013.01); *G06Q 10/0837* (2013.01)

(58) Field of Classification Search
CPC ......... G06Q 10/08355; G06Q 10/0833; G06Q 10/0837; G06Q 10/06312; G06Q 10/0835; G06Q 10/083; G06Q 10/087
See application file for complete search history.

(56) References Cited

U.S. PATENT DOCUMENTS

| 5,781,893 A | 7/1998 | Felthauser |
| 6,937,992 B1 | 8/2005 | Benda et al. |

(Continued)

FOREIGN PATENT DOCUMENTS

| WO | 01/82200 A2 | 11/2001 |
| WO | 2005/089474 A2 | 9/2005 |
| WO | 2016/005592 A1 | 1/2016 |

OTHER PUBLICATIONS

Tippy et al., "Shifting patterns," 2016, downloaded from https://www.pwc.com/gx/en/transportation-logistics/pdf/the-future-of-the-logistics-industry.pdf (Year: 2016).*

(Continued)

*Primary Examiner* — Rupangini Singh
*Assistant Examiner* — Bryan J Kirk
(74) *Attorney, Agent, or Firm* — CPST Intellectual Property Inc.; Brett J. Slaney

(57) ABSTRACT

A system and method are provided for integrating a plurality of supply chain networks, the system comprising interfaces to vendors, consolidation centers, warehouses, retail facilities, and last mile delivery companies to enable multiple retailers to use at least one facility or transportation vehicle from another supply chain or delivery network to utilize excess capacities. The system provides a management service for exposing, abstracting, and integrating multiple supply chain network elements from different parties into a single supply chain and delivery network.

20 Claims, 26 Drawing Sheets

(56) References Cited

U.S. PATENT DOCUMENTS

| | | | |
|---|---|---|---|
| 7,337,031 B1* | 2/2008 | Birjandi | G06Q 10/06 700/99 |
| 7,353,181 B2 | 4/2008 | Nel | |
| 7,853,536 B2 | 12/2010 | Amling et al. | |
| 7,979,359 B1 | 7/2011 | Young et al. | |
| 9,552,564 B1* | 1/2017 | Martenis | G07C 9/00571 |
| 2002/0022983 A1 | 2/2002 | Barton | |
| 2003/0050819 A1 | 3/2003 | Koenigbauer et al. | |
| 2003/0172007 A1* | 9/2003 | Helmolt | G06Q 10/06316 705/28 |
| 2004/0153359 A1* | 8/2004 | Ho | G06Q 10/06315 705/7.29 |
| 2008/0040144 A1 | 2/2008 | Riggs et al. | |
| 2008/0162304 A1 | 7/2008 | Ourega | |
| 2009/0030770 A1 | 1/2009 | Hersh et al. | |
| 2009/0037234 A1* | 2/2009 | Gabrielson | G06Q 10/08 705/6 |
| 2009/0076933 A1* | 3/2009 | Park | G06Q 10/047 705/28 |
| 2014/0089138 A1* | 3/2014 | Borders | G06Q 10/0637 705/26.8 |
| 2016/0071056 A1* | 3/2016 | Ellison | G06Q 10/08355 705/338 |
| 2016/0078523 A1* | 3/2016 | Lopez | G06Q 10/087 705/26.81 |
| 2016/0260158 A1* | 9/2016 | High | G01S 1/70 |
| 2016/0292798 A1* | 10/2016 | Berry | G06Q 10/0832 |
| 2017/0293881 A1* | 10/2017 | Narkulla | G06Q 10/083 |
| 2018/0096414 A1* | 4/2018 | Iacono | G06Q 30/0639 |
| 2019/0043015 A1* | 2/2019 | Nakano | G06Q 10/08355 |

OTHER PUBLICATIONS

Lin, "Resources Requirement and Routing in Courier Service," Department of Management Sciences, City University of Hong Kong, Sep. 2008. Retrieved from https://www.researchgate.net/publication/221787186_Resources_Requirement_and_Routing_in_Courier_Service (Year: 2008).*

Supplemental European Search Report issued in corresponding EP Application No. 18823445; search completed Nov. 9, 2020.

Sabharwal, P.; International Search Report from corresponding PCT Application No. PCT/CA2018/050810; search completed Aug. 14, 2018.

Taherian, H.; "All You Need To Know About Co-Loading"; http://www.inboundlogistics.com/cms/article/all-you-need-to-know-about-co-loading/; Jun. 12, 2017.

Taherian, H.; "Co-loading Your Way to Green"; http://business.edtorg/blog/2014/03/07/co-loading-your-way-to-green/; Mar. 7, 2014.

* cited by examiner

Customer Pick-up Flowchart

SYSTEM AND METHOD FOR EXPOSING AND INTEGRATING MULTIPLE SUPPLY CHAIN AND DELIVERY NETWORKS TO OPTIMIZE CAPACITY UTILIZATIONS

CROSS-REFERENCE TO RELATED APPLICATION(S)

This application is a continuation of PCT Application No. PCT/CA2018/050810 filed on Jun. 20, 2018, which claims the benefit of priority to U.S. Provisional Patent Application No. 62/527,584 filed on Jun. 30, 2017, both incorporated herein by reference.

TECHNICAL FIELD

The following relates to systems and methods for exposing and integrating multiple supply chain and delivery networks, in particular to optimize capacity utilizations.

DESCRIPTION OF THE RELATED ART

Currently retailers establish and utilize a supply chain that allows goods to be obtained from vendors such as manufacturers and factories, wholesalers, and distributors; distributed to warehouses within certain geographical areas; and populated in bricks and mortar retail stores or outlets or made available online. Customers wishing to purchase the goods from a retailer typically makes a purchase at the store, or through an online e-commerce site. For large items, a "last mile" delivery from the store or warehouse to the customer is normally required, e.g., for mattresses, appliances, furniture, etc. When shopping online, goods of all sizes requiring shipping, and this often occurs between a retailer's warehouse or storeroom and the customer's home, office, or other designated delivery location.

As illustrated in FIG. 1, many vendors typically supply many different retailers, each having separate warehouses, physical storerooms, and even warehouses for carriers that make the last mile delivery. Because of this, most retailers establish their own supply chain network. While a dedicated supply chain network has an upside in providing increased control and flexibility within the network, there are normally significant costs associated with having too little or too much capacity in the network. These costs can translate to higher shipping costs to be paid by the customer or be absorbed by the retailer or vendor, or lost sales because delivery times are too long, to name a few.

It is an object of the following to address at least some of these inefficiencies in retail supply chain networks.

SUMMARY

The following provides a system and related methods, software platforms, and user interfaces that expose, abstract, and integrate multiple supply chain network elements from different parties into a single supply chain and delivery network. The single supply chain network enables the density of goods handled at any given edge in the network to be increased by making excess capacity available across what would normally be separate and distinct supply chain and delivery networks.

For example, the following system enables multiple retailers to utilize common consolidation and warehousing facilities, as well as common delivery and shipping networks/routes/trucks/personnel, to increase the efficiencies of all networks. In this way, shipping costs can be minimized to the benefit of consumers enabling retailers to compete on product offerings, services, experience, and usability rather than shipping charges. Moreover, exposing and providing access to capacities in other networks reduces the reliance of any given retailer on a particular transportation or shipping company, e.g., in the event of surges in demand, labor disruptions, etc.

A system is described, for integrating a plurality of supply chain networks, the system comprising interfaces to vendors, consolidation centers, warehouses, retail facilities, and last mile delivery companies to enable multiple retailers to use at least one facility or transportation vehicle from another supply chain or delivery network to utilize excess capacities.

In one aspect, there is provided a system for integrating a plurality of supply chain networks, the system comprising: a server device logically separated from the plurality of supply chain networks to provide a layer of abstraction for supply chain network nodes associated with the plurality of distinct supply chain networks to appear to consumers as a seamless delivery flow; and an interface with each of the supply chain network nodes, wherein the network nodes comprise at least one vendor node, at least one consolidation center, at least one retail node, at least one delivery node, and at least one customer user interface; wherein the server device is operable to determine excess capacities in the network nodes via the interfaces to consolidate at least one delivery operation across multiple retailers in generating delivery routes for customers provided to the customers via the at least one customer user interface.

In another aspect, there is provided a method for integrating a plurality of supply chain networks, the method comprising: providing a server device logically separated from the plurality of supply chain networks to create a layer of abstraction for supply chain network nodes associated with the plurality of distinct supply chain networks to appear to consumers as a seamless delivery flow; interfacing the server device with each of the supply chain network nodes, wherein the network nodes comprise at least one vendor node, at least one consolidation center, at least one retail node, at least one delivery node, and at least one customer user interface; determining excess capacities in the network nodes via the interfaces to consolidate at least one delivery operation across multiple retailers; and using the determined excess capacities in generating delivery routes for customers provided to the customers via the at least one customer user interface.

In yet another aspect, there is provided a computer readable medium comprising computer executable instructions for performing the method.

BRIEF DESCRIPTION OF THE DRAWINGS

Embodiments will now be described with reference to the appended drawings wherein:

FIG. 24 is a screen shot of a customer user interface showing an order-in-transit scenario;

FIG. 25 is a screen shot of a customer user interface showing a missing item scenario;

DETAILED DESCRIPTION

Figure 1:
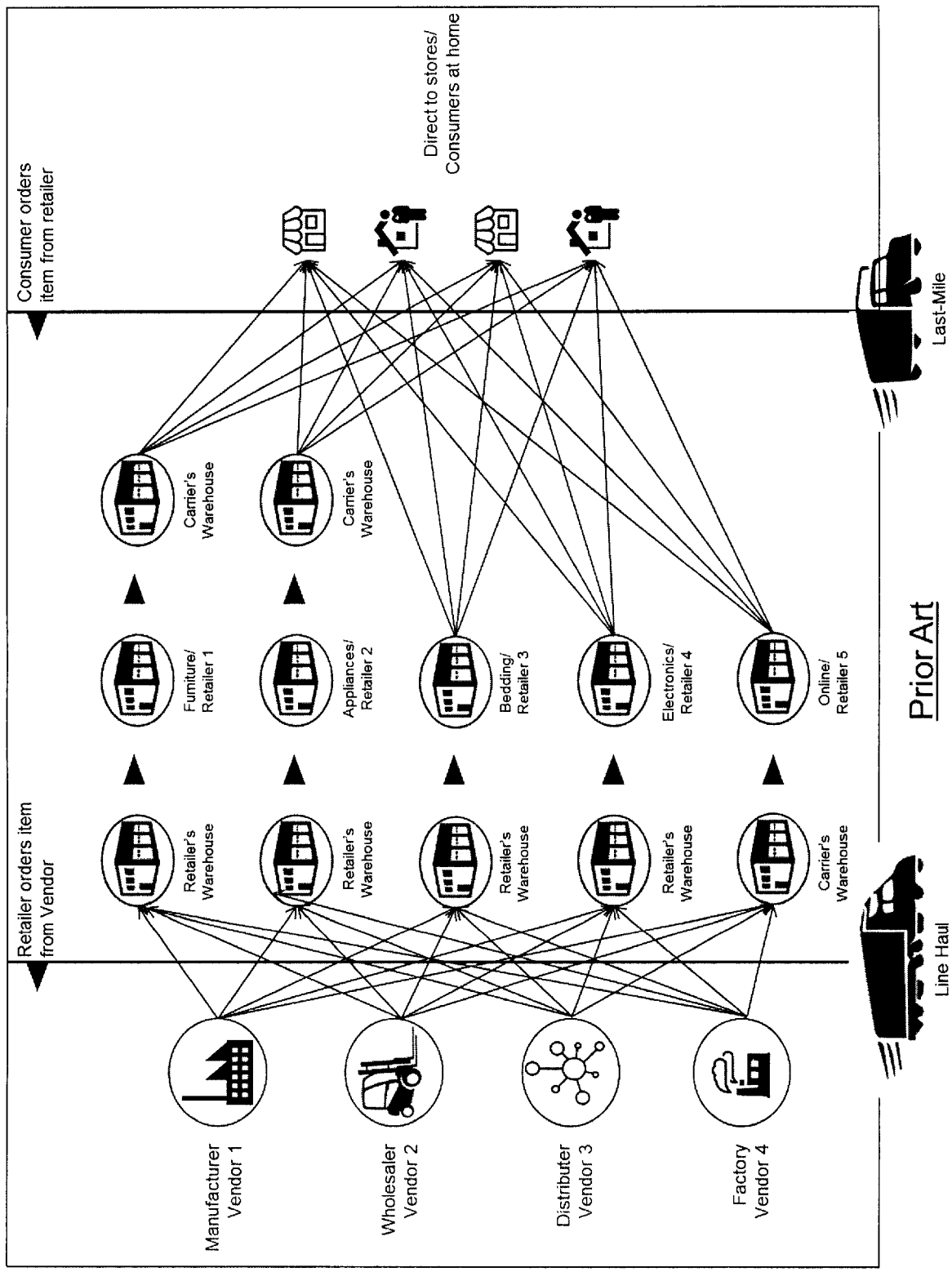
FIG. 1 is a schematic diagram illustrating the complexity of prior art retail supply chains.
Figure 2:
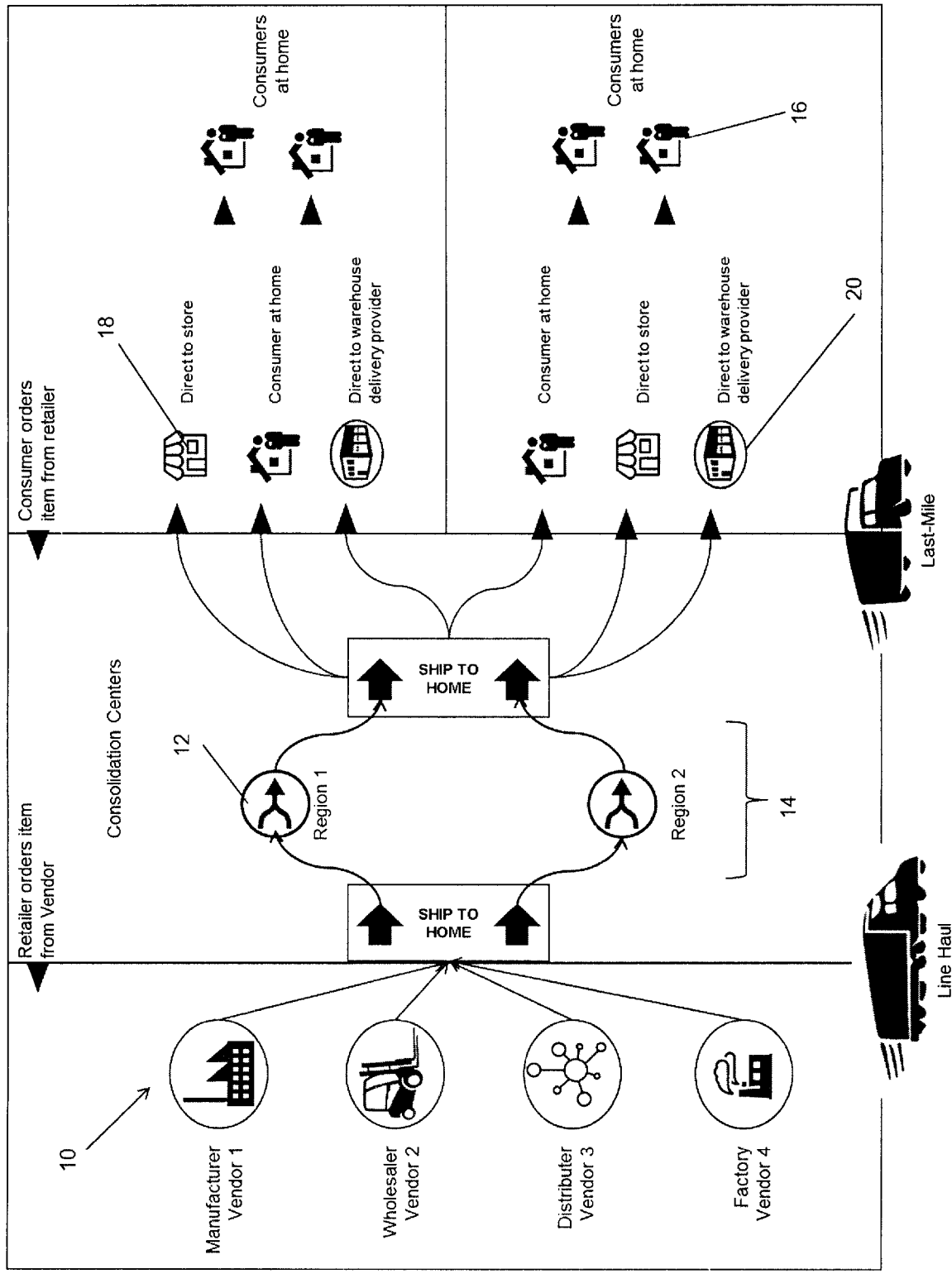
FIG. 2 is a schematic diagram illustrating a simplified retail supply chain enabled by a supply chain management system as herein described.

Turning now to the figures, FIG. 2 illustrates a configuration that exposes, abstracts, and integrates multiple supply chain network elements from different parties into a single supply chain and delivery network. In this example, multiple vendors 10 ship or deliver goods to one or more consolidation centers 12 interfaced with or controlled by a centralized supply chain management (SCM) system 14. The SCM system 14 acts as a layer of abstraction for various disparate supply chain network elements (nodes) to allow for efficiencies to be built into individual retail channels. This is done by not only coordinating the movement and storage of goods within the consolidation facilities (typically referred to as the mid-mile of the network) separate from any given retail or vendor channel, but also coordinating the last-mile deliveries from the retailers (or consolidation centers) directly to the consumers 16. In this way, the SCM system 14 can increase the density of goods in any given edge of the network to enable retail stores 18 and warehouses 20 (retailers 21 generally) to provide reduced-cost deliveries to the consumers 16.

While coordinating the movement of goods between vendors 10 and retailers 21, 20, the SCM system 14 can provide user interfaces within the delivery and shipping environment, the retail environment, and to the customer to allow the integrated supply chain and delivery flow to appear seamless to the customer. This is enabled using APIs and other interfaces between the SCM system 14 and the various entities in the supply and delivery chains to offload the coordination and integration of the process to the SCM system 14.

Figure 3:
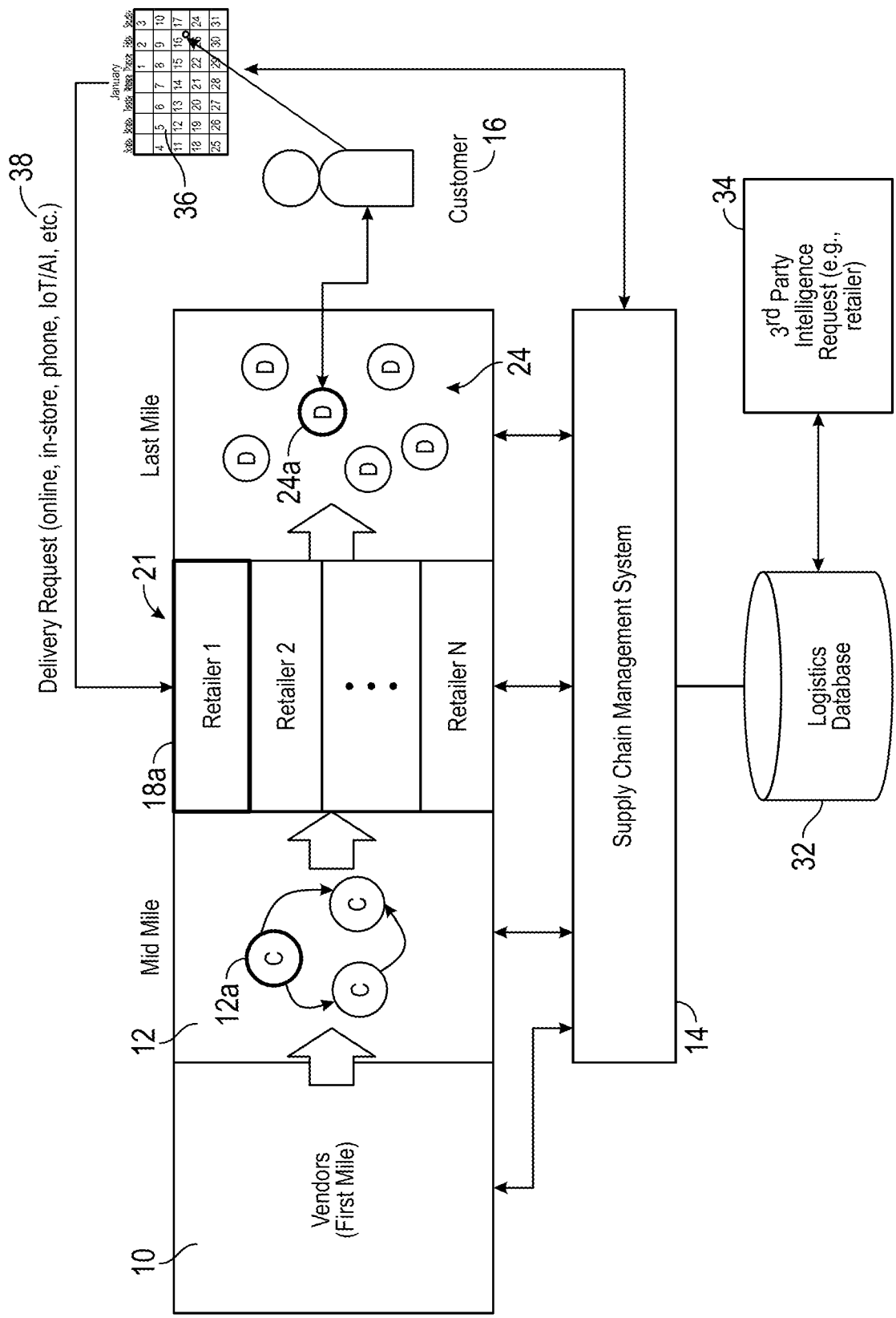
FIG. 3 is a block diagram illustrating an implementation of a consolidated supply chain network facilitated by a supply chain management system interfaced with multiple retailer channels.

Turning now to FIG. 3, an implementation of the SCM system 14 is shown. The SCM system 14 is shown in this illustration as a layer, intermediary, back-end, or complementary service that is plugged into each of the stages of the supply and delivery network to blur the lines between inventory storage nodes. That is, by relying on the SCM system 14, any consolidation center, warehouse, etc. can store goods until they are ready to be placed into a last mile shipment, separate from any strict association with a particular retail channel or distribution entity. As shown in FIG. 3, the vendors 10 (typically considered the first mile), are interfaced with the SCM system 14 to have goods required by a particular retailer 21 (in this example highlighted retail store 18a) shipped to a particular consolidation center 12a.

The mid mile portion of the supply chain and delivery network is therefore also plugged into the SCM system 14 such that dedicated consolidation centers 12 are not necessarily required for each retailer's 21 channel. This not only allows new retailers 21 to emerge without the costly up-front costs of establishing consolidation facilities, but also existing retailers 21 to maximize the usage of their existing facilities, which may already be a sunk cost. This is illustrated in FIG. 3 as a sub-network of consolidation facilities (12a, 12b, 12c in this example) that can be integrated from various sources, including SCM system-managed consolidation centers 12. Based on data acquired over time in a logistics database 32, the SCM system 14 can determine optimal numbers and locations for such consolidation centers 12 to allow, for example, collaborations or eliminations to emerge. The logistics database 32 can also be leveraged by $3^{rd}$ parties, e.g. via $3^{rd}$ party intelligence requests 34. This allows organizations such as retailers, investors, government planners, shipping companies, etc. to use the SCM system's datasets to optimize geographic placement of assets, fleet sizes, personnel deployment, etc.

Several retailers 21 or "retail channels" are shown operating in parallel in FIG. 3. Each retailer 21 may include its own network of bricks and mortar retail stores 18, regional warehouses 20, online e-commerce sites, etc. In addition to optimizing the flow of goods in the first and mid mile portions, it can be appreciated that the SCM system 14 can also enable retailers to eliminate redundancies in warehousing, e.g., if consolidation centers provide sufficient storage and proximity to the retail storerooms or can service direct-to-customer delivers through online purchases. In other words, the SCM system 14 can also optimize intra-channel flow of goods for any particular retailer 21, which again may include storage and shipment of goods for multiple retailers 21 at the same time.

The SCM system 14 also integrates and coordinates the last mile portion of the supply and delivery network, by identifying a particular delivery truck 24 (24a in this example) for the goods that will flow from the particular consolidation center 12a and the retail store 18a. Further detail regarding the coordination of the last mile delivery portion can be found in co-pending U.S. patent application Ser. No. 15/000,899 filed on Jan. 19, 2016 and published as U.S. 2016/0210591, the contents of which are incorporated herein by reference.

The coordination and execution of the flow of goods can be transparent to the customer 16 by having the SCM system 14 integrated into the various retail portals provided to the customer 16 when making a purchase, arranging delivery, and tracking and completing a shipment. For example, as shown in FIG. 3, upon purchasing an item that requires or is desired to include shipping, the customer 16 is presented with an option to select a delivery data and possible one or more delivery time windows. By being integrated with the upstream portions of the supply and delivery network, the SCM system 14 can provide the retail portal with data that allows such delivery dates to be determined. It can be appreciated that various constraints on delivery dates may be imposed depending on the location of the customer, the type of goods being purchased, etc. In any event, through the integration shown in FIG. 3, the retailer 21 and/or the SCM 14 can provide the customer 16 with options that are consistent with the efficiencies built into the shipment and delivery legs of the network.

The retailer 21 after receiving the delivery date request 38 can have the SCM system 14 coordinate the flow of goods to either the store or outlet 18 for pick-up, or direct to the customer 16 using a last mile delivery. The SCM system 14 begins with the selected delivery date to back track within the system to have the vendor 10 ship the good(s) at a particular prior date which takes into account available capacities, routes and travel times, holidays, availability from manufacturers, and whether and how many consolidation and warehousing steps are required to fit within the particular retailer's channel. By having the retailer 21 expose their supply chain network to the SCM system 14, the SCM system 14 can find the most effective way to transport the goods from, for example, a vendor to a customer delivery or pick-up location. Similar logistics are planned at this time to coordinate last mile deliveries by exposing driver fleets that are able to make the delivery.

Figure 4:
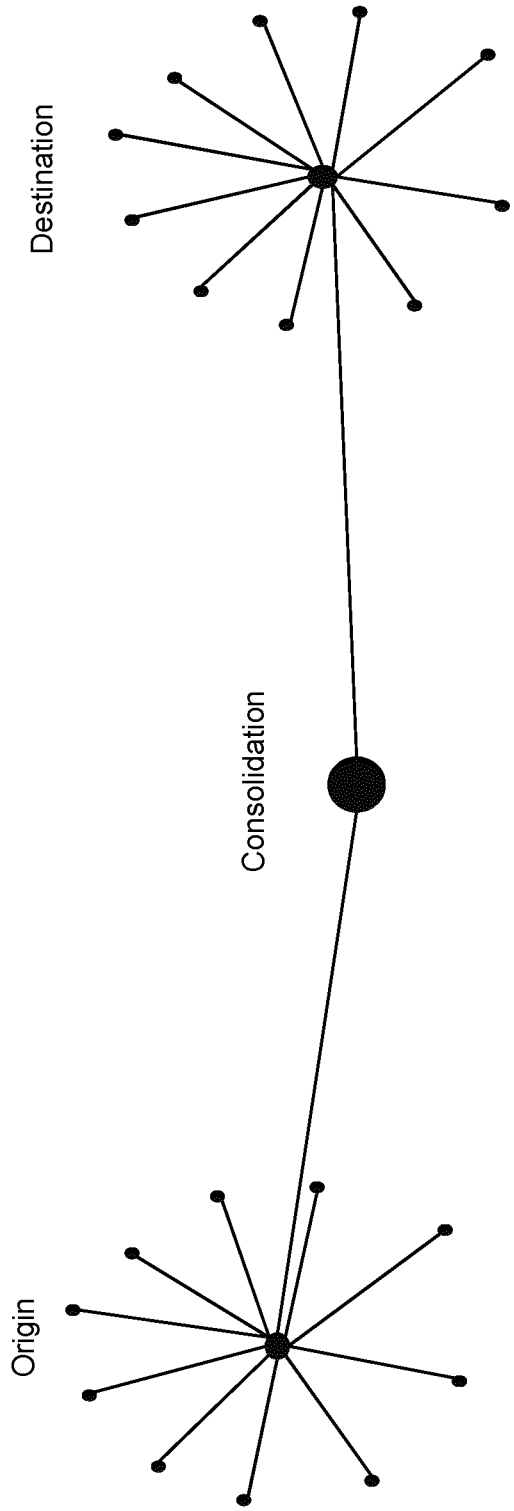
FIG. 4 is a network abstraction illustrating a centralized consolidation segment in a supply chain network having increased density at origin and destination areas.

FIG. 4 illustrates a network diagram with increased density at the origin and destination nodes based on a coordinated consolidation node in between. This allows goods at various origin points to more efficiently channel towards shared consolidation locations, providing more efficient deployment into higher density delivery routes at the destination end. For example, a single transportation vehicle could be arranged to ship goods from multiple vendors to the same consolidation center 12. Then, deliveries from retailers 21 that require multiple goods from similar but different vendors 10 can utilize the same delivery trucks to bring down the overall cost of shipping to the customers 16.

Figure 5:
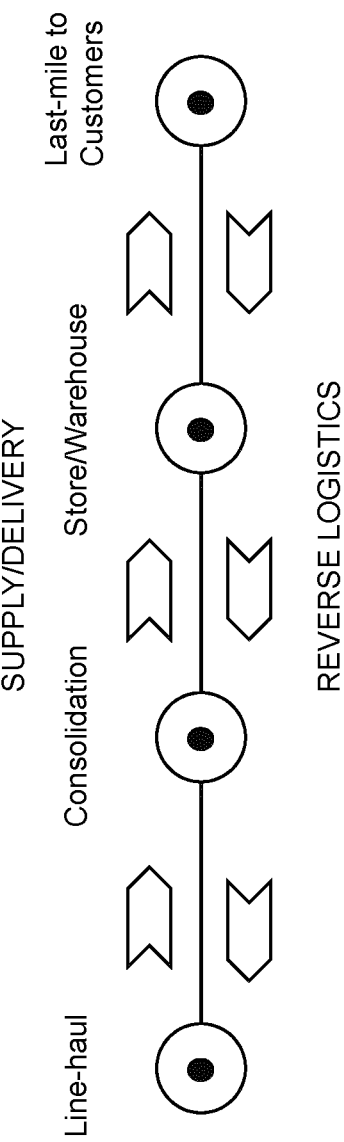
FIG. 5 is a flow chart illustrating supply/delivery and reverse logistic channels within a consolidated supply chain network.

FIG. 5 illustrates the abstracted flow of goods from line-haul to consolidation to storage/warehousing to last mile delivery to customers in a supply/delivery direction, as well as in the reverse direction at any one of these edges by way of reverse logistics. The SCM system 14 can be used to coordinate each of these legs or edges of the network transparently to the customer 16 and even the retailer 21 to provide a seamless supply chain without requiring dedicated facilities at all or any of the nodes.

The supply and delivery network can itself also include multiple layers. For example, in business to business (B2B) interactions, the following layers are facilitated and coordinated:
 1) Vendor→Consolidation center
 2) Distribution center→Retail stores
 3) Pick-up store→Warehouse or Consolidation center
 4) Consolidation center→Home delivery
 5) Reverse Logistics for 1) to 4)

In business to consumer (B2C) interactions, the following layers are facilitated and coordinated:
 1) Consolidation/Warehouse→Consumer
 2) Consumer→Warehouse
 3) Retail store→Consumer
 4) Vendor→Consumer
 5) Customer pick up
 6) Reverse Logistics, in particular for 1), 2), and 4).

In one example, reverse logistics can be applied to facilitate the flow of goods from the consumer or store (e.g. returns) back to consolidation centers 12 or warehouses 20 to enable those goods to be picked up in another delivery channel or transaction. This may allow for tighter delivery dates, particularly when the lead time to obtain goods from the vendor 10 is long, but goods are able to flow in reverse within the abstracted consolidation and shipping portions of the network.

Figure 6:
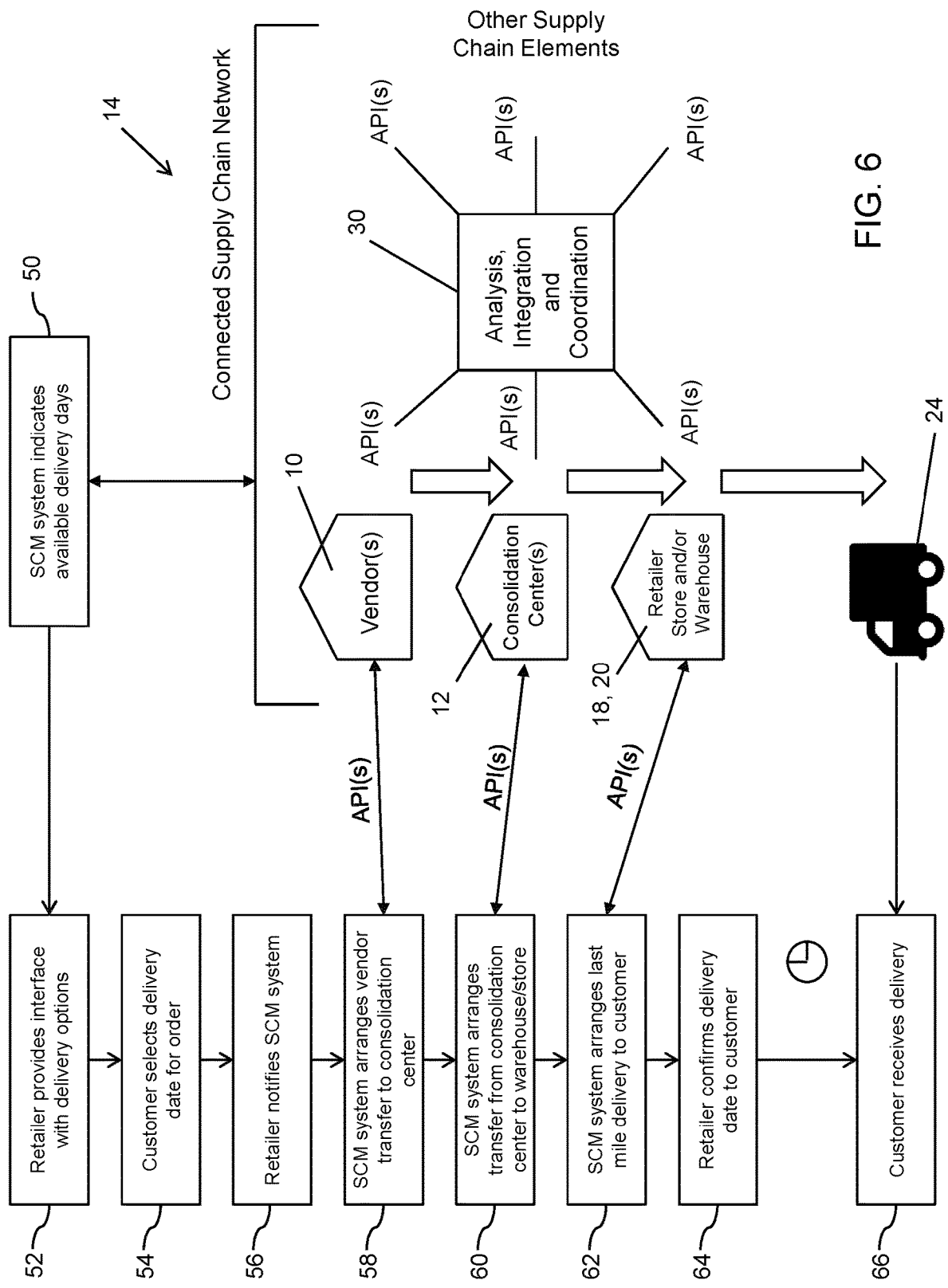
FIG. 6 is a flow chart illustrating operations performed in arranging a home delivery of an item purchased by a customer through a retailer interfaced with the supply chain management system.

FIG. 6 is a flow diagram illustrating the coordination of shipping and delivery of an item purchased by a customer 16. At step 50, the SCM system 14 indicates to the retailer 21 or its online portal available delivery days. It can be appreciated that step 50 may be optional if the retailer 21 instead controls the delivery days and only requires the SCM system 14 to coordinate thereafter. However, if data is available to the SCM system 14, it can provide any constraints around how quickly an item can be delivered, by having access to the various legs of the network. At step 52, the retailer 21 provides an interface to the customer 16 with a delivery option. For example, when purchasing a large item such as an appliance or furniture, many customers require delivery using a last mile delivery truck. Through coordination with the SCM system 14, the retailer 21 can provide this option to allow the customer 16 to select a delivery date for the order at step 54. Based on this selection, the retailer 21 notifies the SCM system 14 at step 56 of the selected delivery date, such that the SCM 14 can work backwards to ensure that the goods are either delivered from the vendor 10 to the appropriate consolidation center 12 or warehouse 20 or moved within the mid mile portion to efficiently transfer into the last mile leg of the delivery.

At this point, the customer 16 has completed the purchase and delivery arrangement from his/her perspective, and the retailer 21 coordinates with the SCM system 14 to facilitate the flow of the goods associated with the order. For example, at step 58 the SCM system 14 can arrange a vendor transfer to a consolidation center 12 and a subsequent transfer from the consolidation center 12 to a warehouse 20 or retail store 18 at step 60. The SCM system 14 can also arrange the last mile delivery to the customer 16 at step 62, that accounts for any of the other arrangements, including timing, availability, holidays, etc. The retailer 21 can also confirm the delivery date to the customer 16 at step 64, for example, if any of the arrangements in steps 58-62 require adjustment of the delivery date, or to simply provide a tracking number, delivery company info, driver info, etc. Since some or all of the steps taken by the SCM system 14 may occur after the customer 16 makes the purchase and selects the delivery date, step 64 may be required one or more times after the retail transaction occurs. For example, the customer 16 may perform step 54 at a retail store 21 after viewing some furniture, and have a follow-up email sent that confirms the delivery details sometime after leaving the retail store. In the interim, the SCM system 14 coordinates and facilitates the most efficient supply and delivery chain transparently or substantially transparently to the customer 16.

In order to implement a process such as that shown in FIG. 6, the SCM system 14 can have a central analysis, integration, and coordination sub-system 30 that uses APIs into the various supply chain elements (including those shown by way of example in FIG. 6). In addition to coordinating the flow of goods, the sub-system 30 can also be used to collect and analyze data to continually improve and refine the algorithms used to plan routes, determine optimal consolidation centers 12 and locations, etc.

Figure 7:
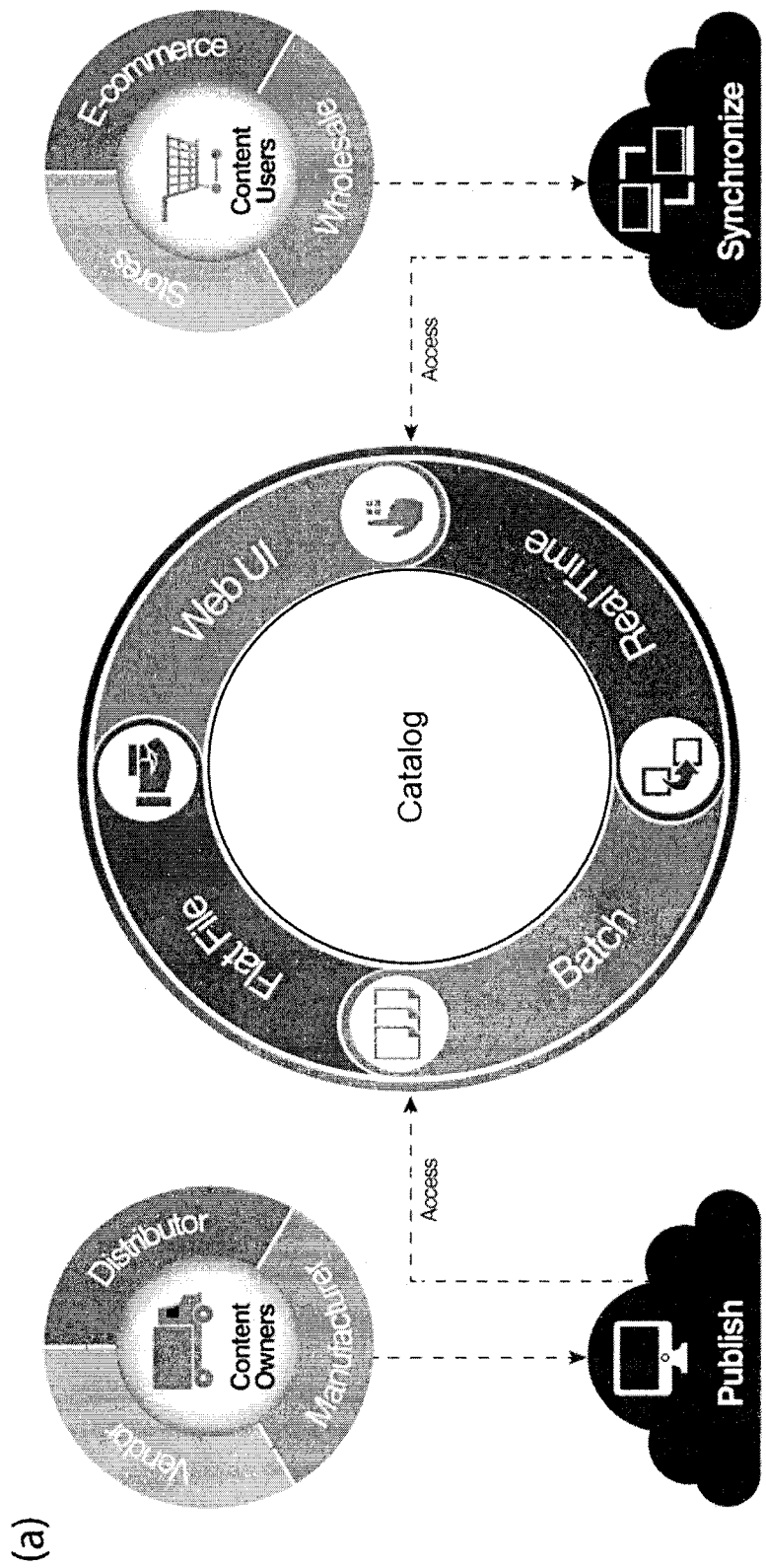
FIG. 7 is a flow diagram illustrating the consolidation of a product catalogue.

FIG. 7 illustrates a centralized catalog wherein vendors 10, distributors, and manufacturers can provide and maintain an electronic catalog of products, with SKUs, definitions, descriptions, quantities, multimedia, etc. This content can be published to retailers 21 so that it is available in their ERP systems connected to the point of sale and e-commerce sites. This allows the retailers 21 to tap into data coordinated through the SCM system 14.

Figure 8:
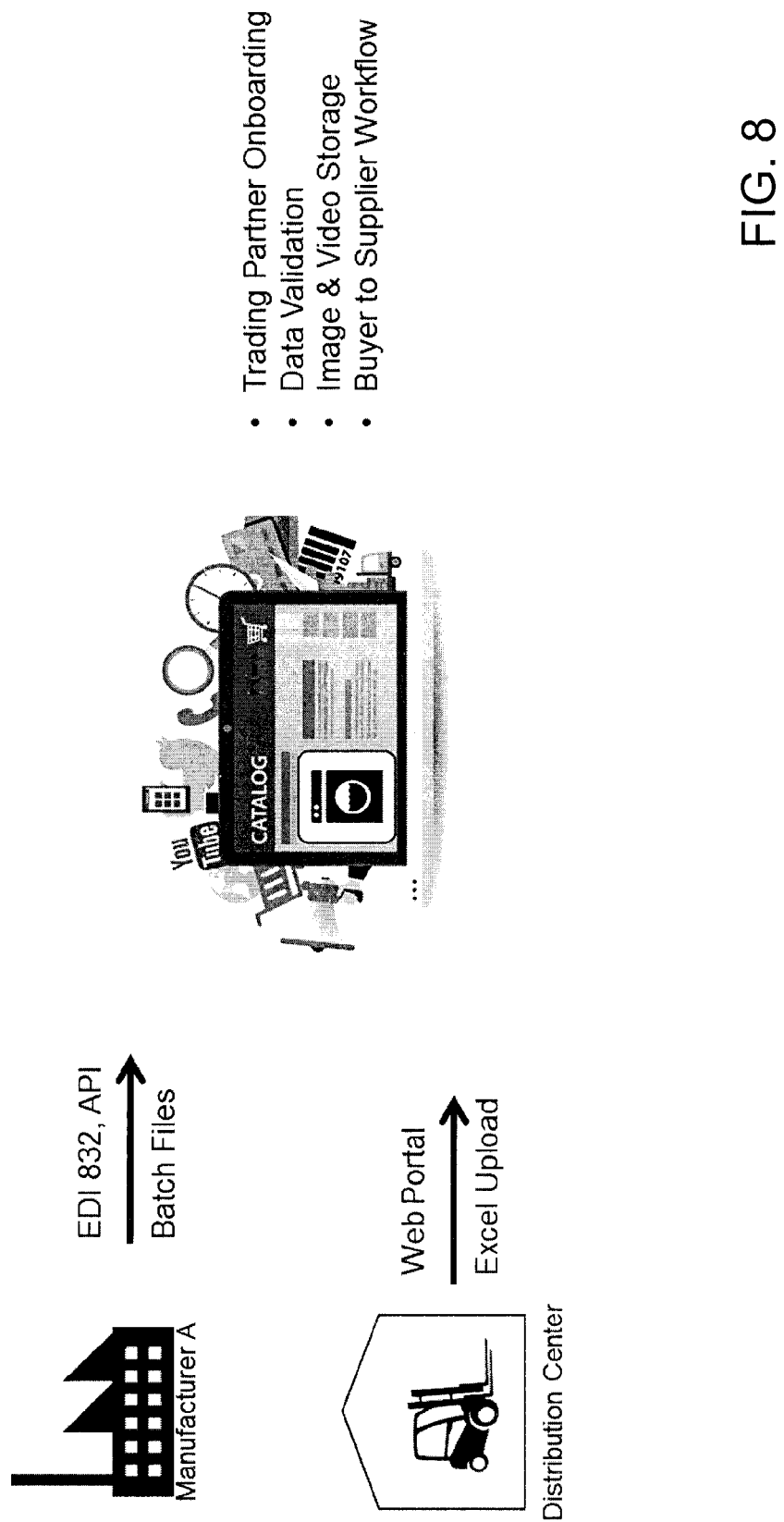
FIG. 8 is a pictorial illustration of creation of the product catalogue shown in FIG. 7.

FIG. 8 illustrates how data is flowing into such a catalog, namely by EDI, API, batch files or simply via web interfaces, and pushed to the catalog so that the retailer 21 will have the information in real-time so that the goods are available for sale through the retailer 21 at that time. Once the retailer 21 makes a sale, the SCM system 14 can provide the transit time and delivery dates so that the customer can complete the transaction and schedule its delivery at the time of sale.

FIGS. 9 through 32 illustrate various scenarios and workflows that enable the SCM system 14 to interact with the retail channels, delivery channels, and the customers 16.

Figure 9:
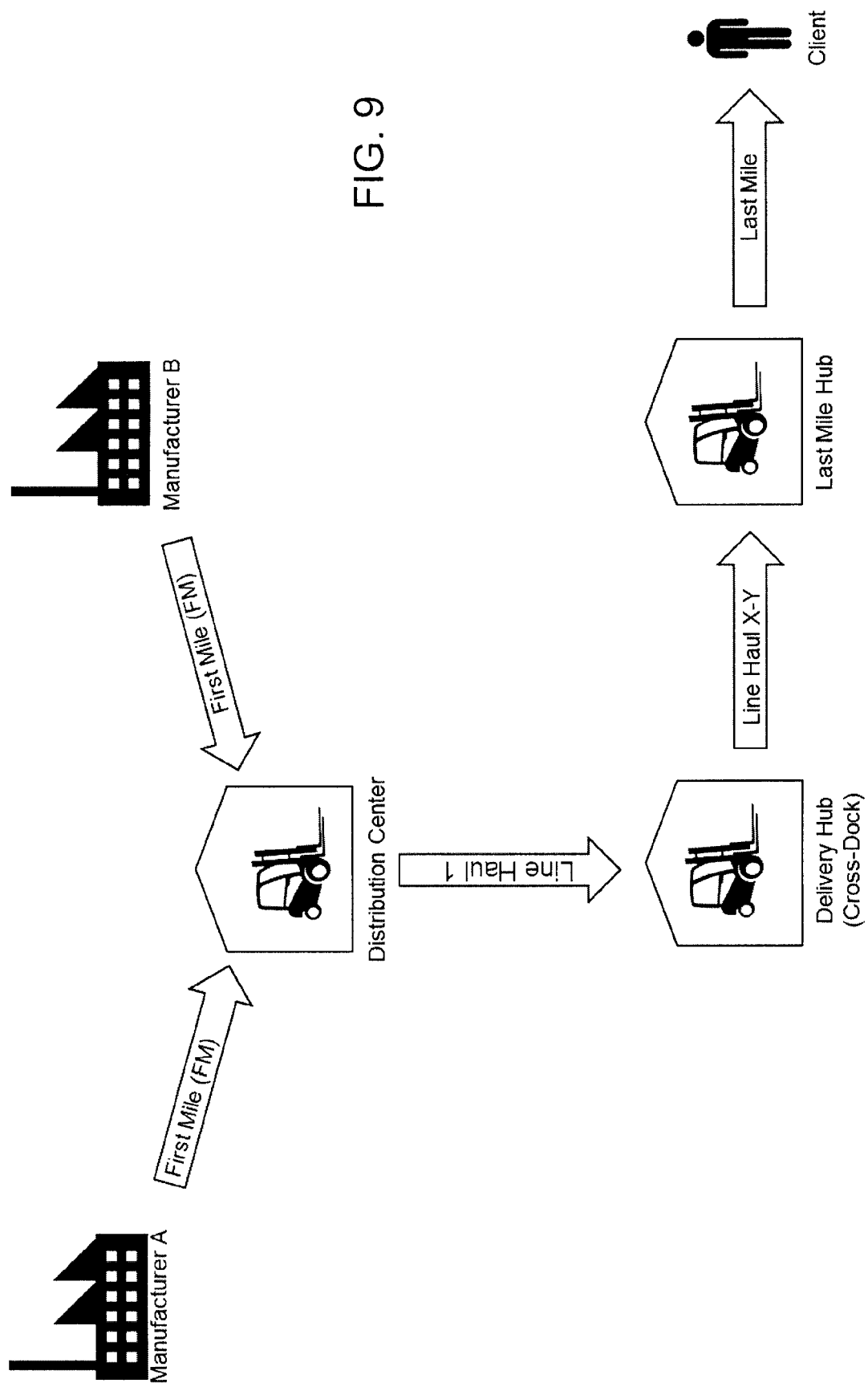
FIG. 9 is a flow chart illustrating a supply chain path for multiple goods delivered to a client.

FIG. 9 illustrates a generic path along which goods in a customer order may follow from manufacturers to the final customer or client 16. During this path, various resources are involved, including manufacturing staff (first mile), distribution center staff (first mile), delivery hub staff (first and last mile), line-haul drivers (first mile), delivery drivers (last mile), and customer (initial order and last mile). Each of these sets of resources has preferences and constraints that are interpreted by the SCM system 14. In the line-haul segments of the network, goods are brought from the first mile hub to the last mile hub. Constraints that can affect the shipping dates include: shipping schedule at the origin hub, receiving schedule at the destination hub, holidays, transit time from origin to destination. In the first mile segment, the same constraints typically apply, but additionally it should be considered that the first mile is where the goods are assumed to physically be at the beginning of the process. The initial hub also has an extra constraint, namely cut-off time. For instance any order that is imported after the cut-off time would have an extra day added to the earliest shipping date as it is assumed that they would be unable to start the delivery process on the same day.

The last mile segment is not hub-to-hub, but from the last mile hub to the end customer 16. Some constraints include the final delivery hub schedule, specific buffer times from the hub (e.g. to provide extra time allocated to the route), delivery drivers' schedules, opened trucks for online reservation (i.e. what and how many trucks are available), offerings of the retailer/carrier inside the customer area (postal code/zip code), reachability of the customer location (e.g. remote locations).

With these constraints in mind, the SCM system 14 can determine which dates are available to the customer 14, such that where these constraints are not respected, certain corresponding dates are shown as unavailable to that customer 16 for that order.

The manufacturer segment of the supply chain can also be abstracted in the same way as a distribution center or warehouse as it can be treated as a hub through which merchandise flows. APIs can be provided to the manufacturers to similarly coordinate orders, shipments, and movement through the various hubs.

Figure 10:
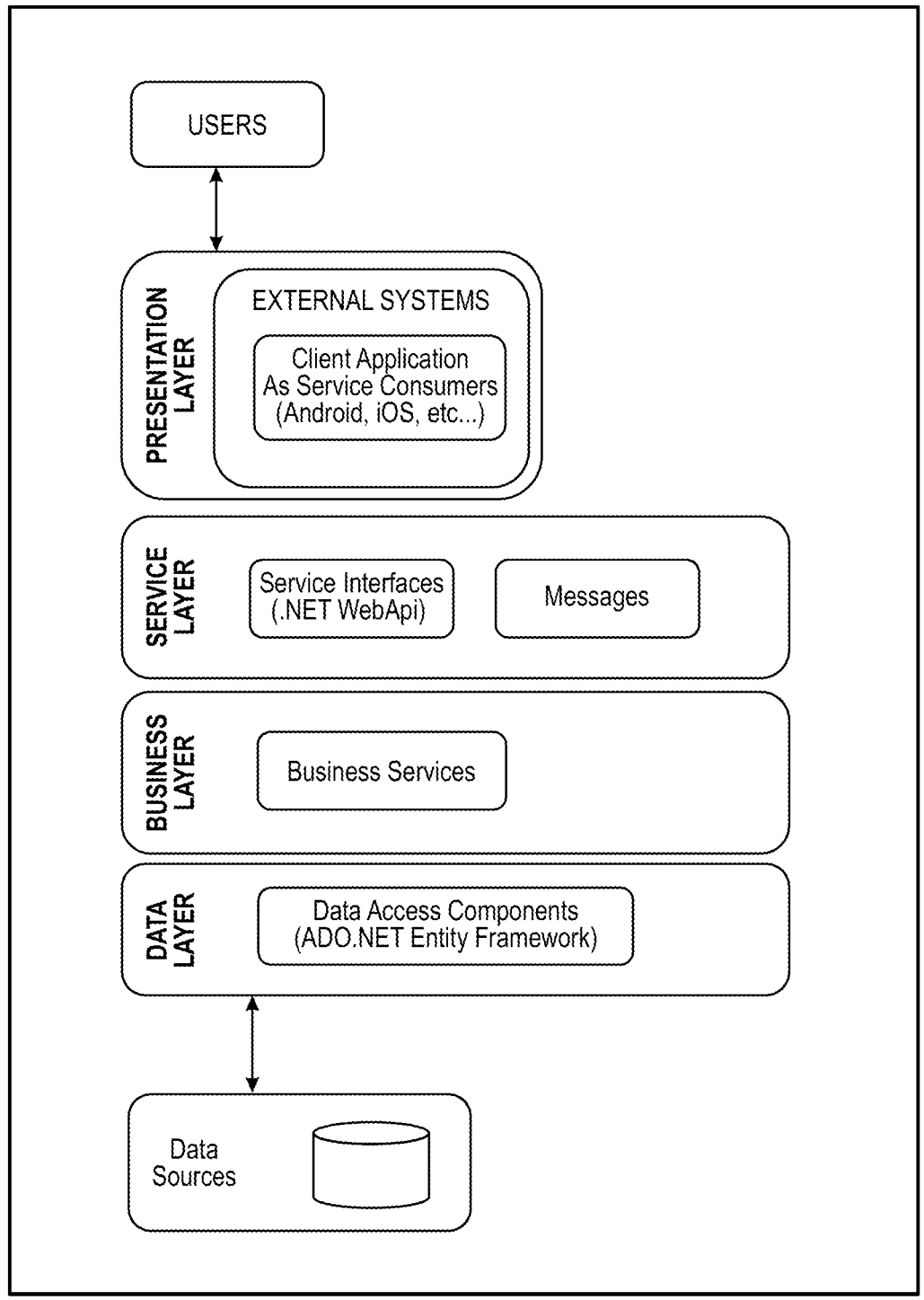
FIG. 10 is a block diagram of a logical view of a mobile platform.

The SCM system 14 can provide any suitable computing architecture to integrate and interface with the various entities in the abstracted and integrated supply chain and delivery network. FIG. 10 provides a logical view of an example of a mobile platform that can be implemented by the SCM system 14. In this logical view, a presentation layer is provided to interface with external systems, particularly client applications. A service layer provides various service interfaces and messages, a business layer provides business services, and a data layer operates data access components to interface with the data sources.

Figure 11:
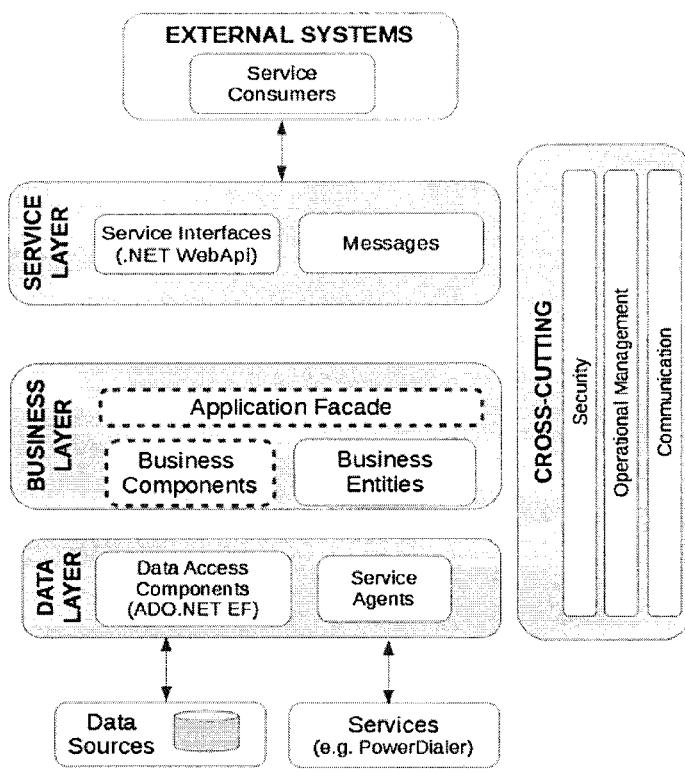
FIG. 11 is a block diagram of a logical view of a mobile web service.

FIG. 11 provides a logical view of an example of a mobile web service. A service layer distributes messages to the controllers, which utilize one or more business services. The data layer in this service includes data access components and service agents. A cross-cutting component provides security, operational management, and communication elements.

Figure 12:
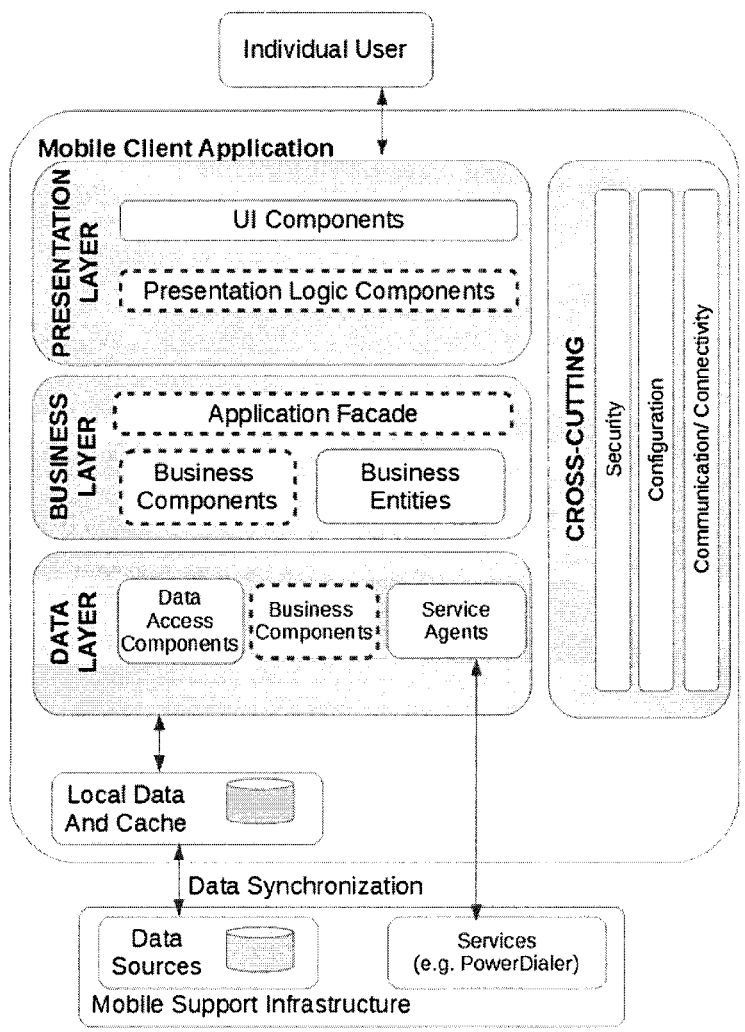
FIG. 12 is a block diagram of a logical view of a mobile client application.

FIG. 12 provides a logical view of an example of a mobile client application. The presentation layer includes various UI components supported by the presentation logic components to provide the user experience. The business layer includes business entities to ensure that data is handled correctly. The data layer has access to local data storage and is responsible for data synchronization with the web service in this example configuration.

Figure 13:
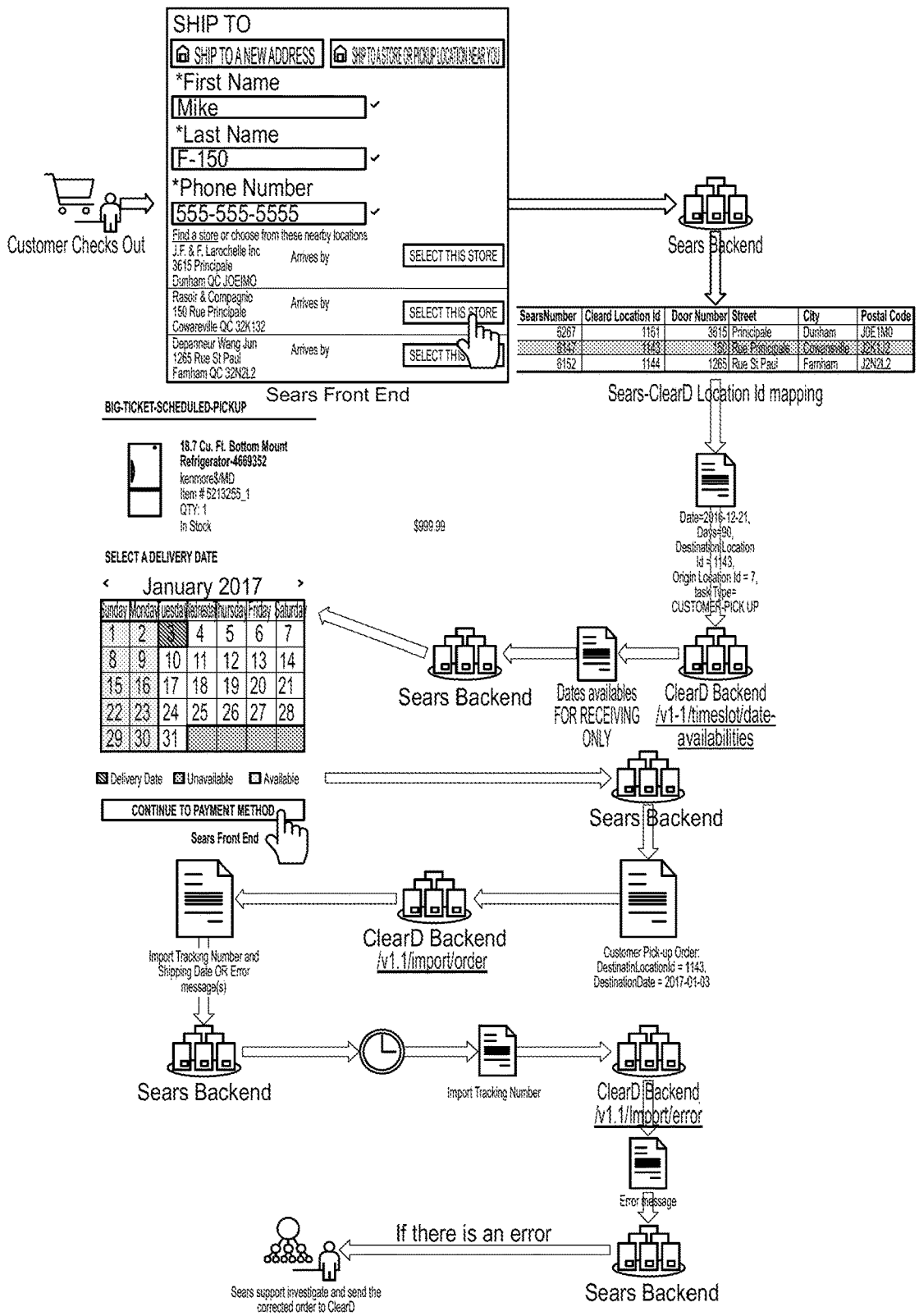
FIG. 13 is a flow diagram illustrating a customer pick-up scenario.

FIG. 13 provides an example customer pick-up flowchart that illustrates various operations between the SCM system 14 (illustrated as ClearD) and the backend of a retail channel, such as a retail store that arranges a delivery service for large items such as appliances or furniture. In this scenario, the customer 16 selects a pick-up from a particular retail store 18. The retailer 21 back-end system identifies the location and communicates with the SCM system 14 to populate a calendar with the available pick-up dates for that location. The customer 16 may then selected a desired one of the available dates and cause the retailer back-end to generate a customer pick up order for the destination of the pick-up. The SCM system 14 then coordinates the shipment of the goods to that location and provides tracking information to the retailer backend. FIG. 13 also shows coordination between the SCM system 14 and the retailer backend to handle error messages if necessary for errors in an order. It can be seen that the SCM system 14 is relied upon by the retailer 21 to both present the delivery options to the customer 16 and to coordinate the actual flow of the goods to the pick-up location.

Figure 14:
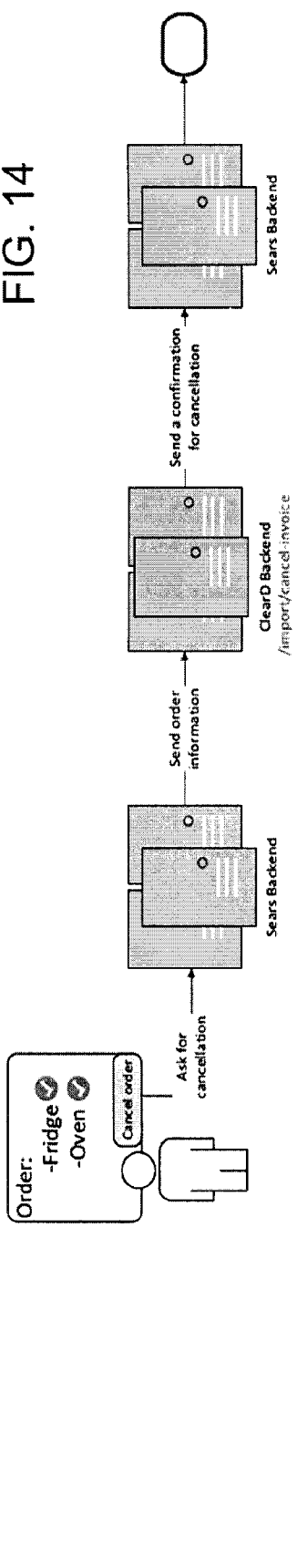
FIG. 14 is a flow diagram illustrating an order cancellation workflow.
Figure 15:
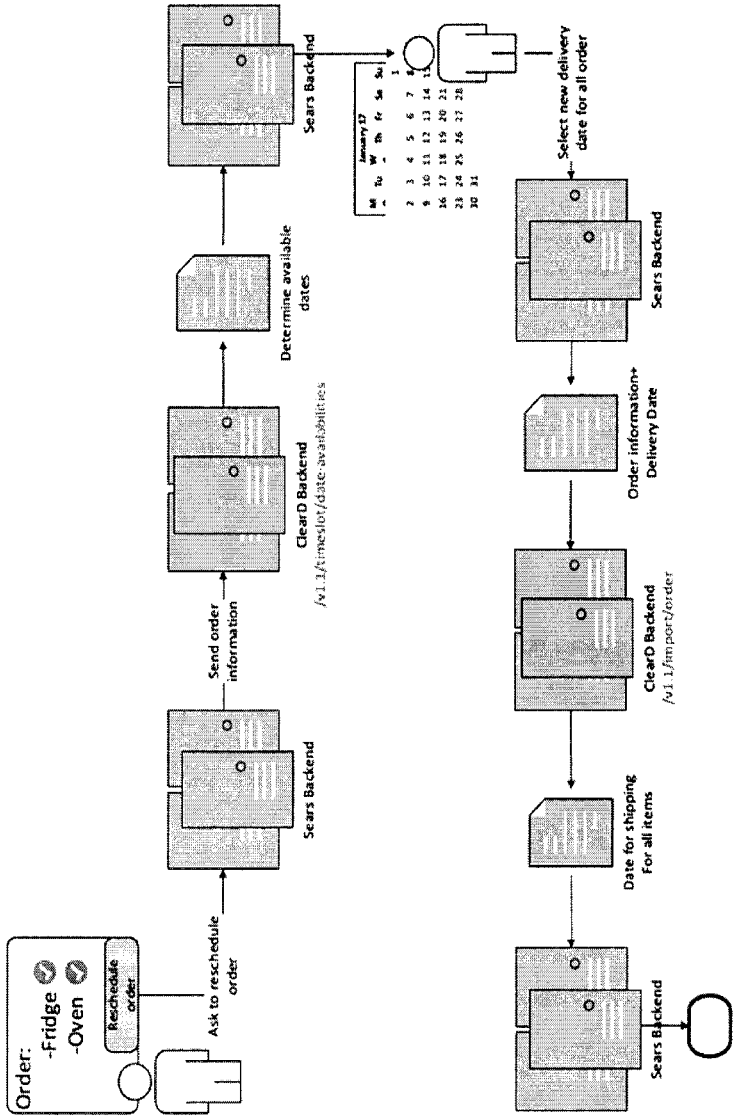
FIG. 15 is a flow diagram illustrating an order rescheduling workflow.
Figure 16:
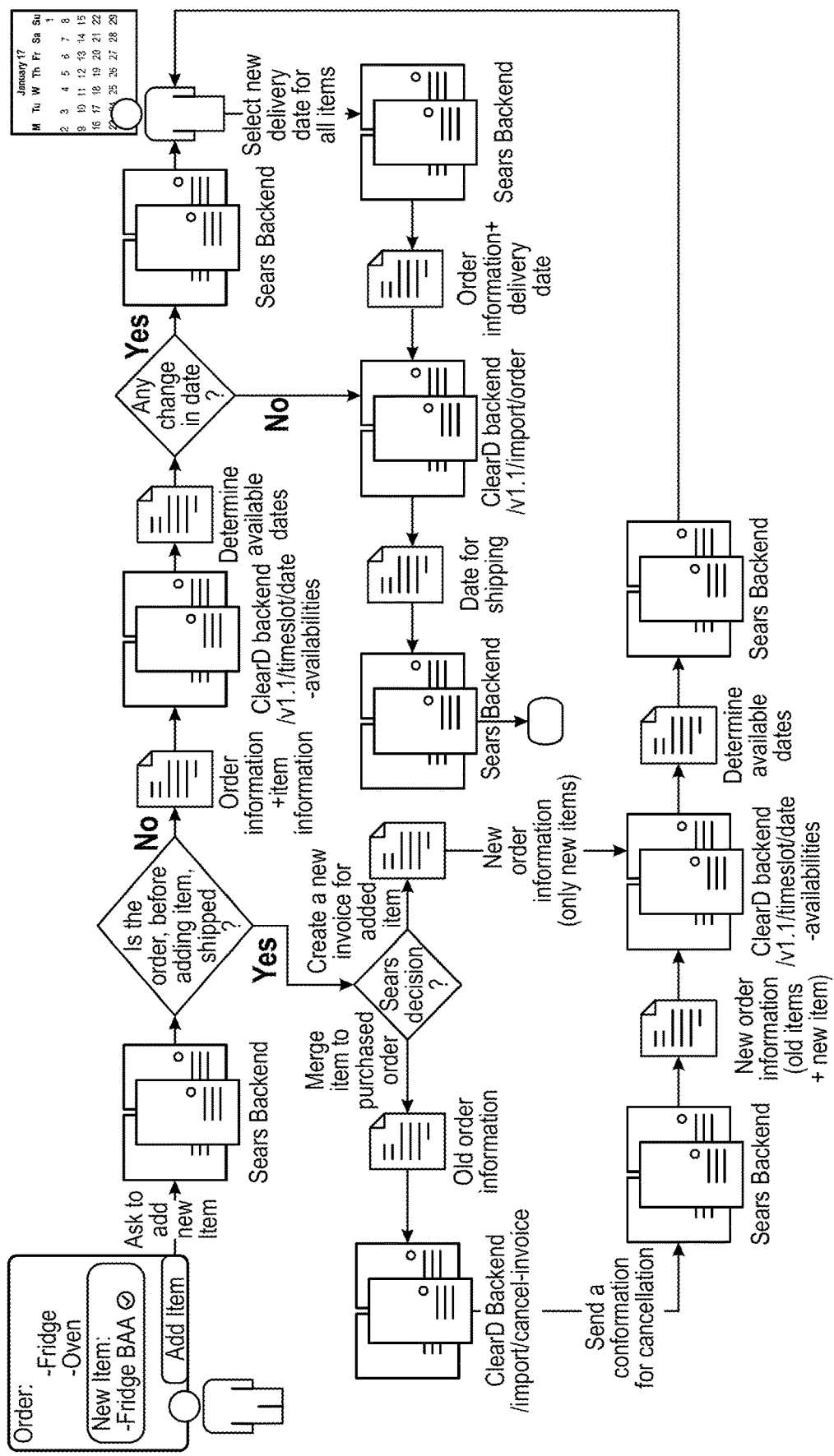
FIG. 16 is a flow diagram illustrating an order modification workflow for adding a new item to the order.

FIGS. 14 to 16 illustrate additional scenarios carried out by customers 16 with respect to an order to further illustrate the coordination between the SCM system 14 and the backend systems of the retailer 21. In FIG. 14, an order cancellation is shown, wherein a customer 16 cancels an order on a retailer website or by phone. The customer's request is sent to the retailer's backend to cancel the actual order, which triggers a function call to send order information to the SCM system 14 in order to have the SCM system 14 cancel the order at its end. The SCM system 14 then sends a confirmation of the cancellation back to the retailer 21 to confirm that the items will not be shipped as originally planned.

FIG. 15 provides a scenario in which a customer reschedules an order, e.g. online or by phone. Here, the customer's request is sent to the retailer's backend to reschedule the order, which triggers a functional call to the SCM system 14 to provide the order information to the SCM system 14. The SCM system 14 then re-determines available dates and sends that information back to the retailer backend to allow the retailer 21 to present a new availability calendar in a user interface to the customer 16. Upon selection of a desired delivery date, the retailer backend provides new order information to the SCM system 14 to coordinate any new shipping and delivery arrangements and providing further coordination with the retailer backend as required.

FIG. 16 provides an example of a scenario wherein a customer 16 is requesting to add an item to an existing order, made via the retailer. The retailer backend system would determine first if the order has already shipped. If not, order information is provided to the SCM system 14 to determine available dates and coordinate a new delivery date if necessary as shown in FIG. 15 and described above. If the order has already shipped, the new item can be merged to the existing order or a new order can be created, depending on the preferences and constraints of the retailer backend system. In a merge, the old order can be sent to the SCM system 14 to initiate a cancellation of that order which is confirmed to the backend system of the retailer 21 and new order information created. In either branch, the new order information is passed back to the SCM system 14 to determine available dates and schedule the new order arrangements as described above.

Figure 17:
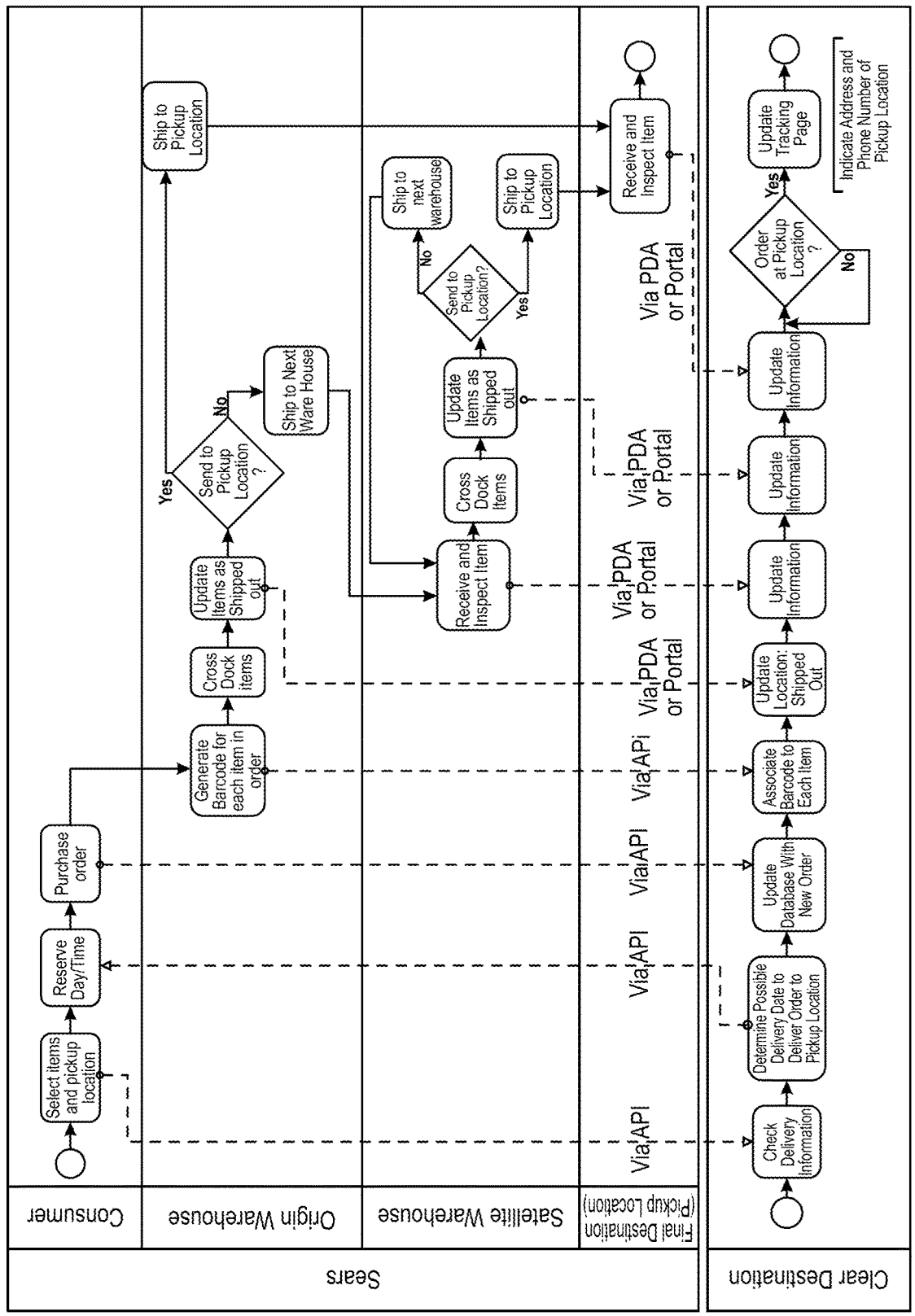
FIG. 17 is a flow diagram illustrating a customer pick-up process.

Turning now to FIG. 17, another example of a customer pick-up workflow is shown to illustrate the coordination between the retail channel and the SCM system 14. The customer 16 in this example selects one or more items to be picked up at a store and the pick-up location. This information is fed to the SCM system 14 via an API. The customer 16 then selects a day/time for the pickup which is based on information provided to the customer via the SCM system 14. The customer also makes the purchase which is communicated to the SCM system 14 via an API. The SCM system 14 meanwhile checks the delivery information and determines the possible delivery date to deliver the order at the selected pickup location, which dictates the available days/times for the customer 16 to select. The SCM system 14 also updates its database with the new order. The order generates a barcode for each item in the order at the warehouse 20 and the items are cross-docked and shipped from the warehouse 20. The barcode information and shipping status are communicated to the SCM system 14 via API, PDA, portal, etc. This allows the SCM system 14 to update its information during the supply chain progress.

The warehouse 20 will either ship to the location or ship to another warehouse 20 in this example. If shipment to another warehouse 20 occurs, the items are received and inspected, cross-docked, and sent out to the next warehouse 20 if applicable, or the pick-up location. The final destination receives the order and inspects the item(s). As illustrated in FIG. 17, these various steps are communicated to the SCM system 14 to allow the SCM system 14 to update its information, and enables further coordination, e.g., if the SCM 14 is involved in arranging delivery trucks between warehouses 20, the use of other retailers' consolidation centers 12 or warehouses 20, etc. The SCM system 14 is also able to update tracking information, e.g., to notify the customer 16 that the order has arrived and is ready for pick-up.

Figure 18:
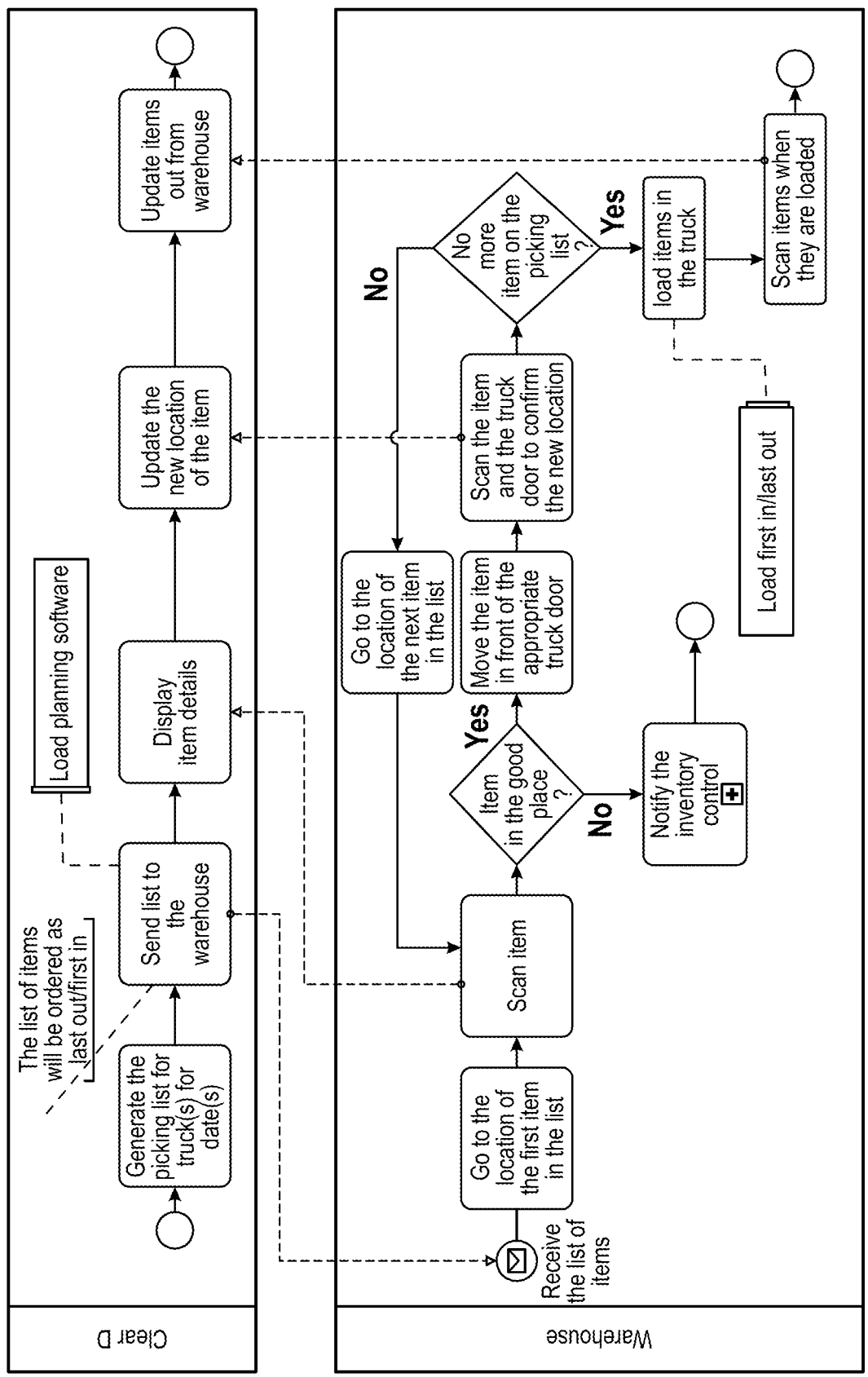
FIG. 18 is a flow diagram illustrating a staging and picking process.

FIG. 18 shows a staging and picking workflow in which the SCM 14 generates a picking list for a truck at a warehouse 20 and sends the list to the warehouse 20. The warehouse 20 receives the list of items and goes to the location of the first item to scan that item. If the item is not in a convenient place, an inventory control system is notified. The scanned item is also communicated back to the SCM system 14 to enable it to display item details. The warehouse 20, if the item is placed correctly, moves the item to the appropriate truck door and scans the item and truck to confirm the new location, which is sent to the SCM system 14 for updating. This repeats until all of the items in the order from that warehouse 20 are placed near the shipping truck. The items are then loaded and scanned again to confirm loading, which is communicated back to the SCM system 14. As shown in FIG. 18, load planning software can be used by the SCM system 14 to optimize the planning for a particular warehouse 20, e.g., by having floorplans, inventory lists, etc. When the items are loaded in the truck, controls can be implemented to ensure that the items are loads first in/last out, consistent with the planning and picking list to optimize the picking and staging.

Figure 19:
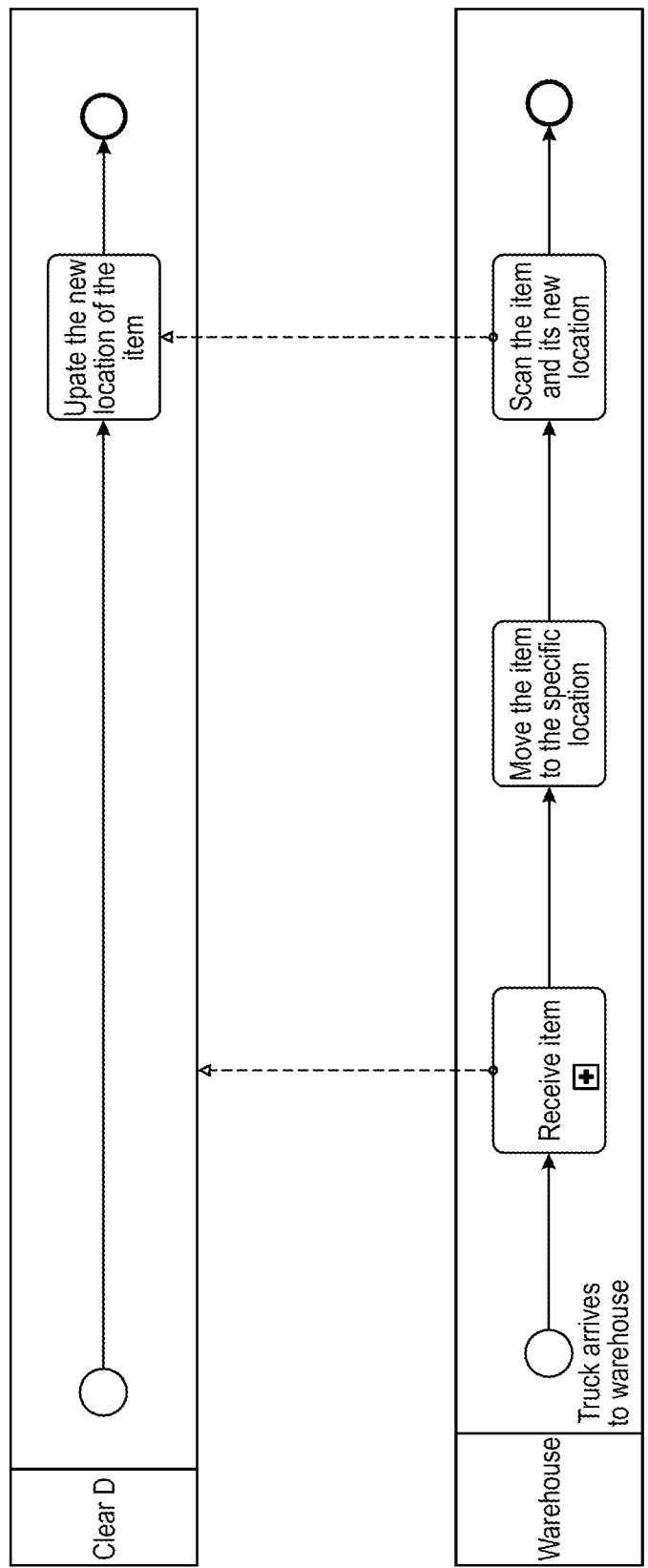
FIG. 19 is a flow diagram illustrating a reverse logistics process.
Figure 20:
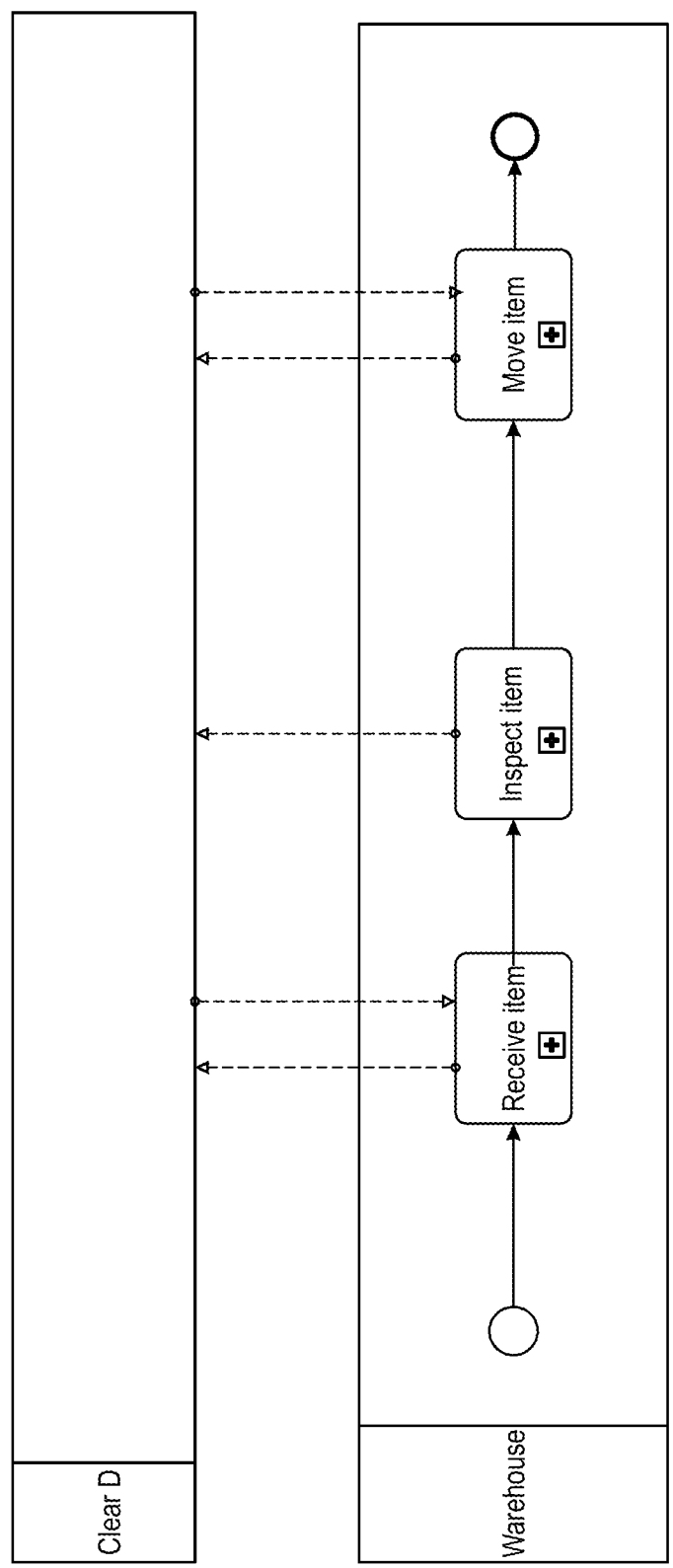
FIG. 20 is a flow diagram illustrating a warehouse receiving process.

FIG. 19 illustrates a reverse logistics procedure generally, wherein a truck arrives at a warehouse 20 returning items along a reverse logistics path. The item is received and moved to a specific location and scanned. The warehouse 20 and location within the warehouse 20 are communicated to the SCM system 14 to enable coordination of that item with respect to a customer return, inventory reshuffling, recall or warranty, etc. FIG. 20 illustrates an item being received at a warehouse 20, inspected, and moved. This process involves communicating the steps back to the SCM system 14 and may be applied when, for example, items are transported between different warehouses 20. Similar operations can be applied at any hub that is utilized in the supply chain and delivery network.

Figure 21:
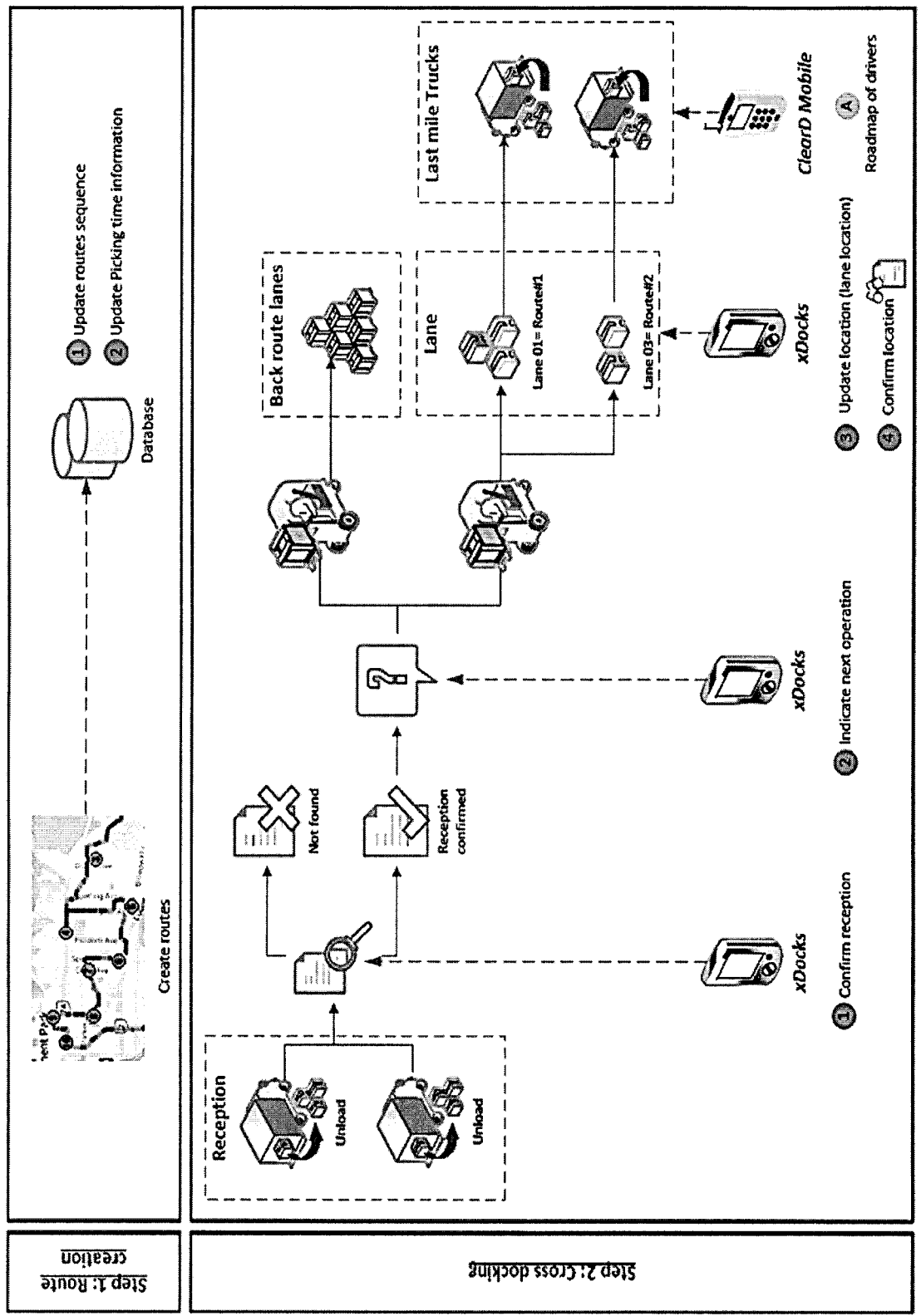
FIG. 21 is a flow diagram illustrating a cross-docking process.

FIG. 21 provides further details in respect of an example cross-docking scenario. Cross-docking is a practice in logistics of unloading materials from an incoming semi-trailer truck or railroad car and loading these materials directly into outbound trucks, trailers, or rail cars, with little or no storage in between. In this example, routes are created for the shipping of various items, with a database updated with routes sequencing and picking time information. In a second step, the cross-docking occurs at a facility such as a warehouse 20 or consolidation center 12. At reception, multiple trucks are unloaded at the facility and the unloaded items are checked against inventory or order lists to confirm reception of the expected goods. The expected items are either found or not found. A mobile application for cross-docking can be used as illustrated to determine the next operation(s), such as movement to particular lanes in the warehouse 20 and to update the locations where they are placed. With this information fed back to the SCM system 14, the coordination of last mile trucks 24 is enabled and optimized based on the routes, number of drivers, etc. The SCM system 14 can provide a mobile application to drivers as shown in FIG. 21 to enable coordination between the shipment hubs and last mile deliveries.

Figure 22:
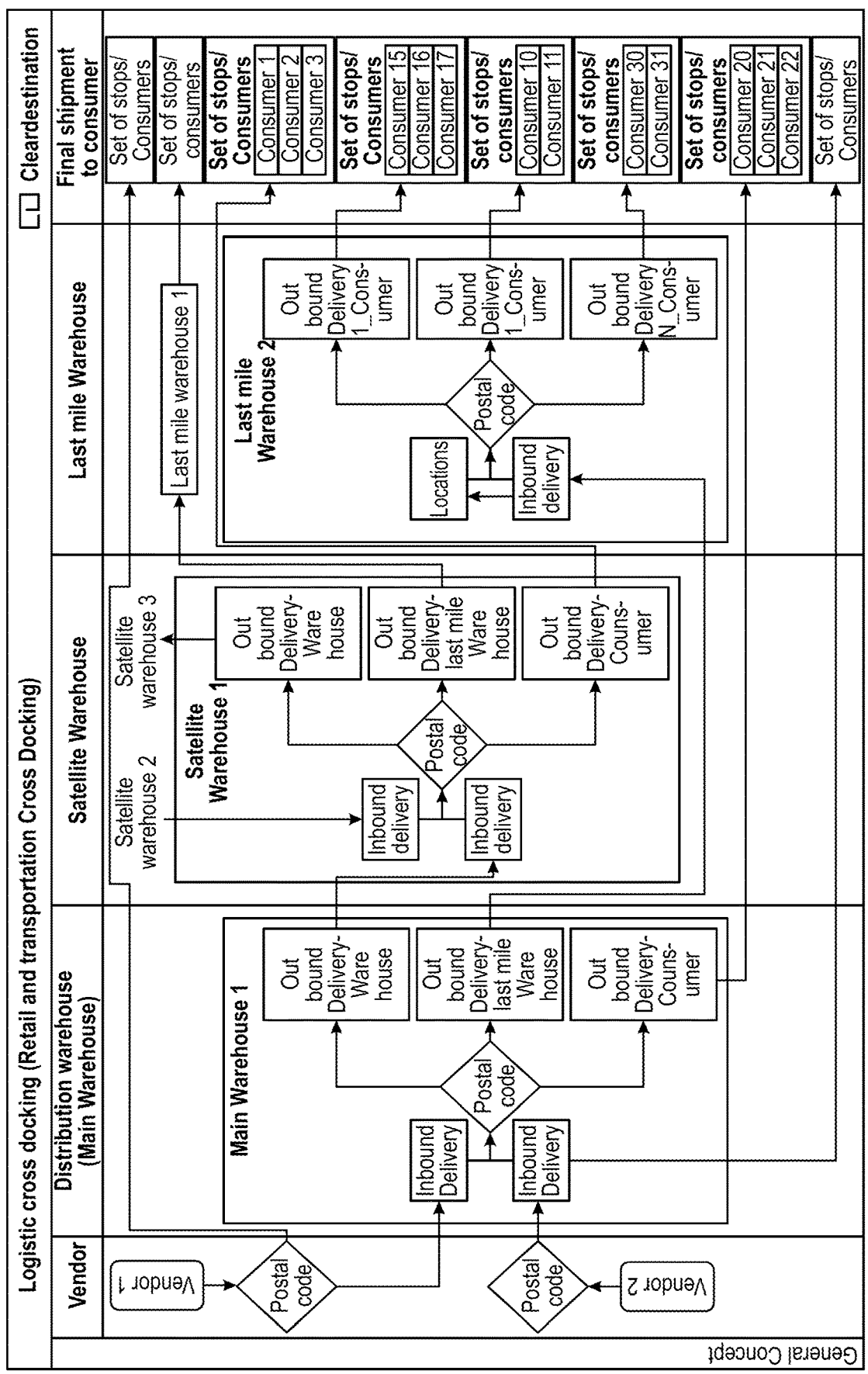
FIG. 22 provides further detail for a cross-docking logistics example.

FIG. 22 provides a logistics mapping for a cross-docking example that uses multiple warehouses 20. In this example, two vendors 10 (Vendor 1 and Vendor 2) ship goods to either a final last mile shipment phase or to a distribution warehouse 20 based on a postal code (i.e. proximity, remoteness, etc.). Here a main warehouse 20 receives inbound deliveries from both vendors 10 and based on the associated postal codes for the deliveries redirects goods to a satellite warehouse 20, a last mile warehouse 20, or the final shipment to the customer 16. It can be seen that within each warehouse 20, including the last mile warehouse 20, the goods can be redirected to different delivery routes (or other warehouses 20) based on location. This allows the last mile portion of the supply chain to be optimized. It can be appreciated that the SCM system 14 can also optimize the shipments and other movements prior to the last mile segments as discussed above (e.g. to have the same warehouse 20 service multiple retailers 21).

Figure 23:
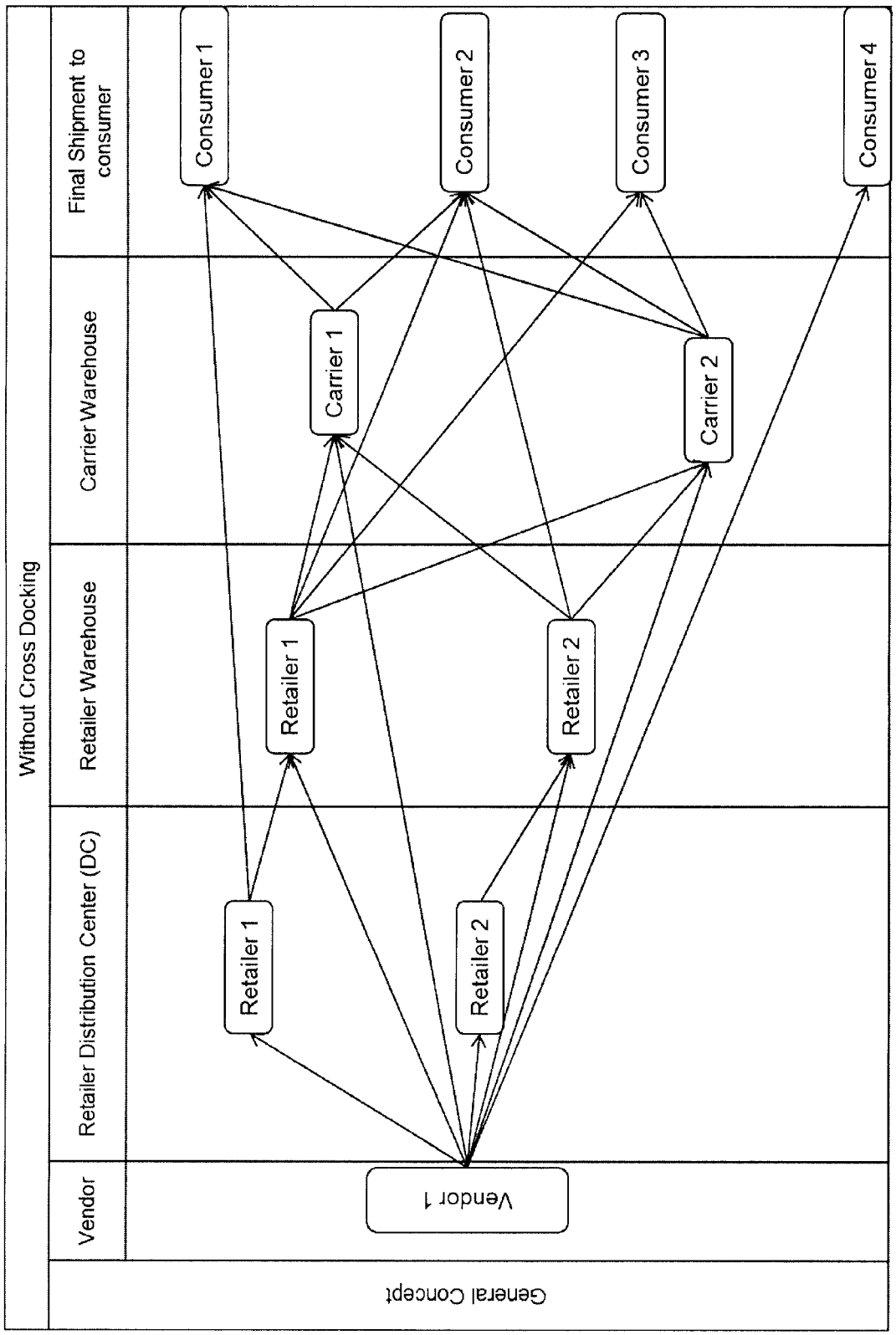
FIG. 23 is a flow diagram illustrating a logistics example without using cross-docking.

FIG. 23 provides an example of the various logistics that need to be coordinated without cross-docking. Here it can be seen that for each vendor 10, shipments may be required within multiple retailer channels, but can use the same distribution center 12 and retailer and carrier warehouses 20. Whereas the complicated paths could lead to inefficiencies when each retailer has its own separate supply chain and delivery network, the SCM system 14 allows efficiencies to be built in by abstracting across the mid mile locations.

Figure 24:
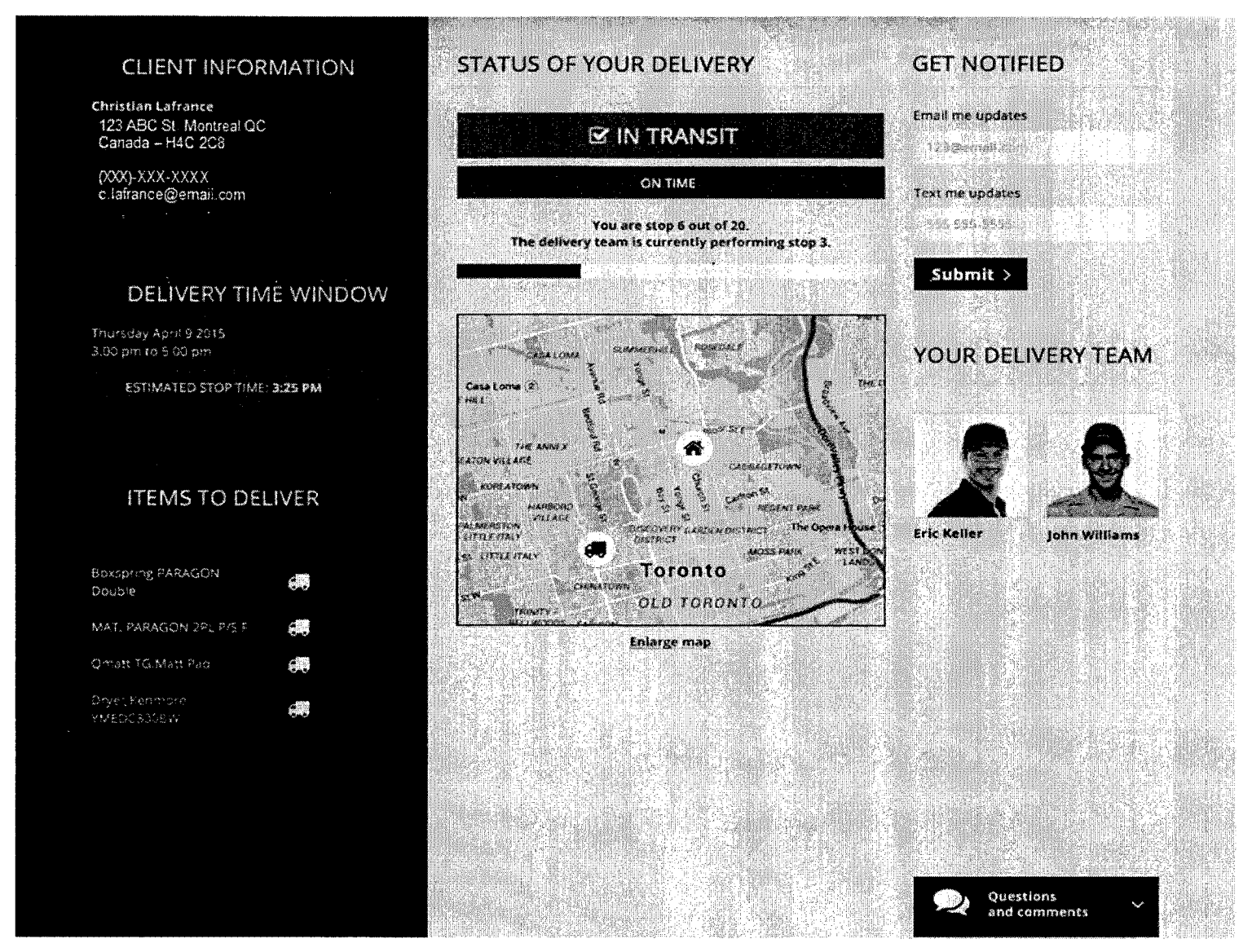

As indicated above, the SCM system 14 can provide or integrate with user interfaces that are used by the customers 16 and/or the shippers/drivers. In FIG. 24, a customer user interface is shown in which an order is in transit. The SCM system 14 can provide such information through a retailer's online portal using APIs, and allows the customer 16 to benefit from the integration of the entire supply and delivery chain.

Figure 25:
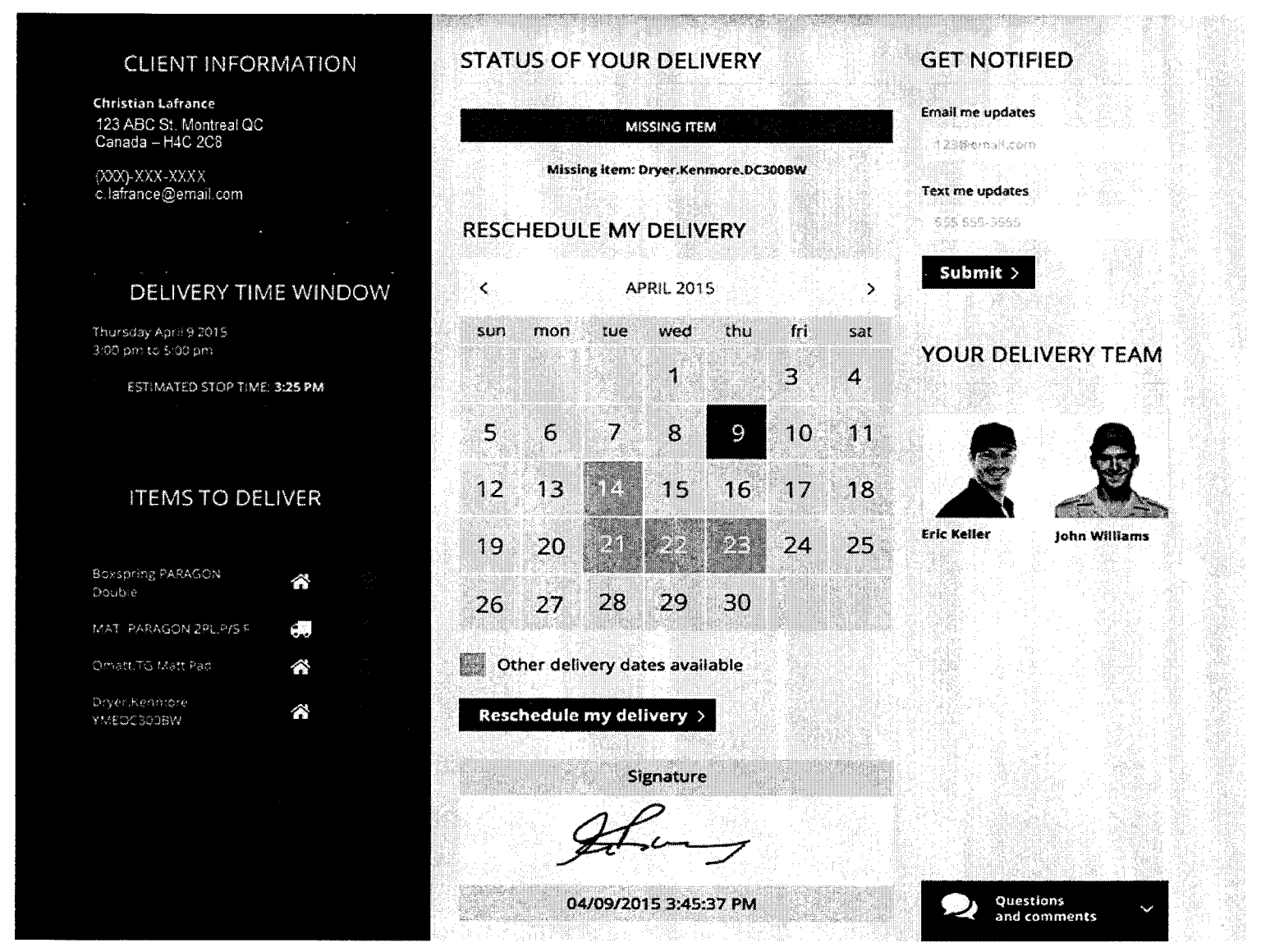

FIG. 25 provides an example of the same user interface during a missing item scenario wherein the customer 16 is provided with a rescheduling calendar to provide seamless reorganization of an order to account for missing portions of an order. Similar user interfaces can also indicate when the order has been shipped, provide pictures, damage reports, etc. as well as other status points within the process.

Figure 26:
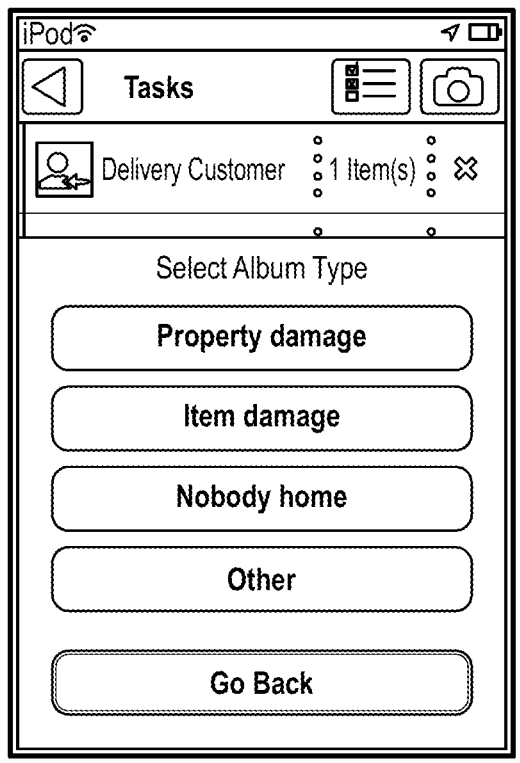
FIG. 26 is a screen shot of a user interface for delivery personnel to enable selection of an album type.
Figure 27:
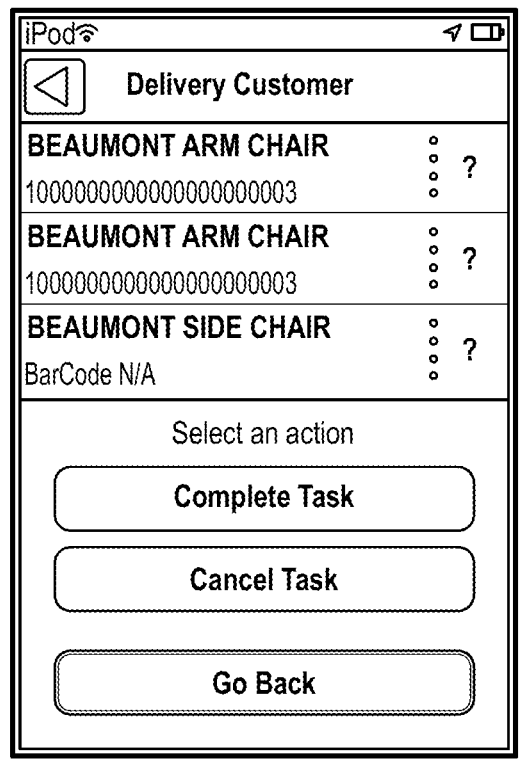
FIG. 27 is a screen shot of a user interface for delivery personnel to enable an action item to be selected.
Figure 28:
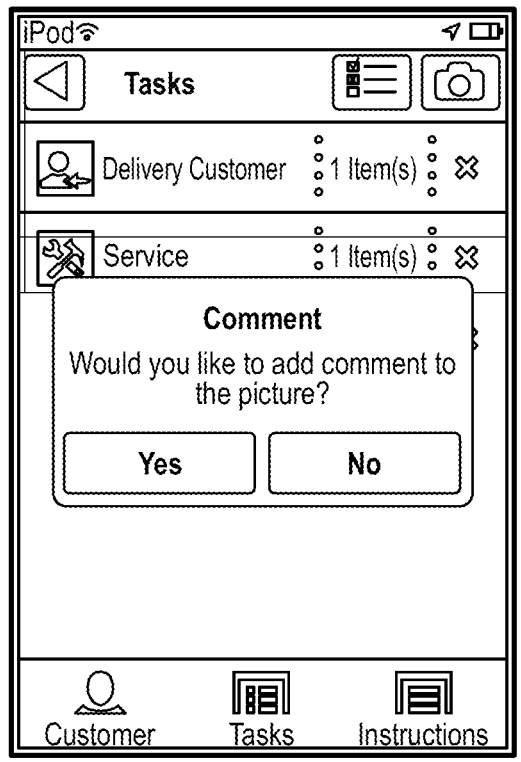
FIG. 28 is a screen shot of a user interface for enabling a comment to be added to a picture taken upon delivery of an item.
Figures 29, 30:
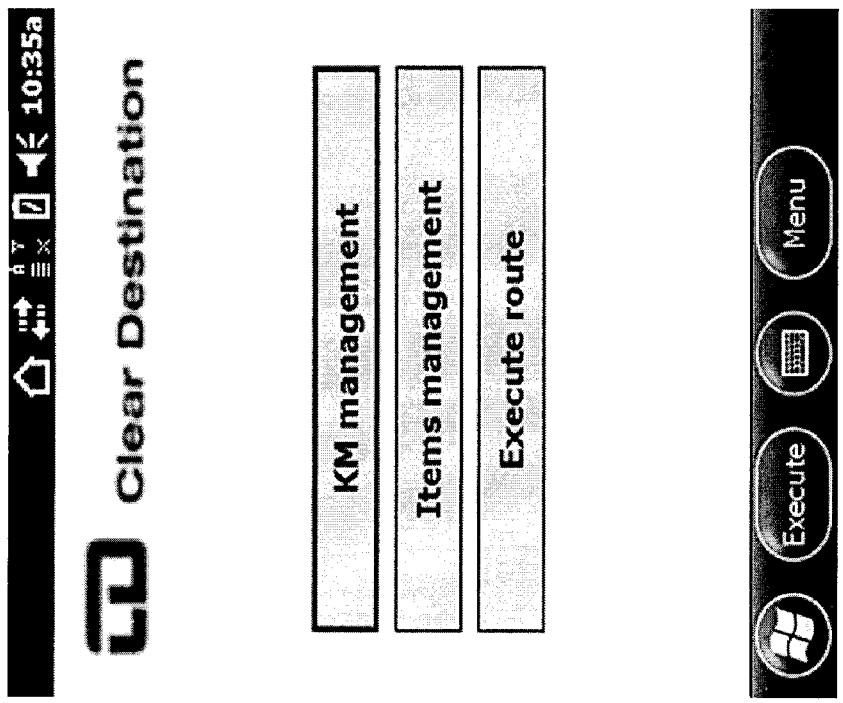
FIG. 29 is a screen shot of a user interface for enabling a delivery driver to enter mileage data.
FIG. 30 is a screen shot of a main menu user interface for a delivery driver application.
Figures 31, 32:
FIG. 31 is a screen shot of a truck loading/unloading user interface for a delivery driver application.
FIG. 32 is a screen shot of a delivery item inventory user interface for a delivery driver application.

FIGS. 26-32 provide screen shots of example user interfaces that can be provided by the mobile application service to delivery or shipping. In FIG. 26 a tasks menu is shown that allows the driver to select whether there is property damage, item damage, whether or not anyone is home, or other events associated with the delivery or shipment. A delivery action menu is shown in FIG. 27 wherein the driver can select whether the task is completed or should be canceled. FIG. 28 illustrates a user interface in which comments can be added to a picture taken in relation to the delivery or shipment. FIG. 29 provides a user interface to enable a driver to log the date, starting and ending mileage. FIG. 30 provides a menu interface for KM management, items management and execute route. FIG. 31 provides a user interface for recording and capturing loading/unloading tasks, and FIG. 32 a user interface for loading items onto a truck from a warehouse 20 including scanning barcodes therefor.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the SCM system 14, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A supply chain management system for integrating a plurality of disparate supply chain networks, each of the plurality of supply chain networks including a plurality of supply chain network nodes having at least one vendor node, at least one retailer node, and at least one consumer node, the supply chain management system comprising:

a server device interfaced with a plurality of consolidation centers and communicatively connected to each of the supply chain network nodes of the plurality of supply chain networks via respective application programming interfaces (APIs), wherein each of the plurality of consolidation centers are separate from each of the plurality of supply chain networks, the server device being configured to:

acquire data associated with each of the plurality of supply chain networks, the data including at least a location of each of the supply chain network nodes associated with the plurality of supply chain network nodes;

determine a number of consolidation centers from the plurality of consolidation centers and location for each of the number of consolidation centers based on the acquired data associated with each of the plurality of supply chain networks, each of the determined number of the consolidation centers being configured to be shared among the plurality of supply chain networks for storing one or more items to be transported to and from the plurality of supply chain network nodes, wherein the number and location of consolidation centers is continually refined based on the acquired data;

enable, via a customer user interface provided by a first supply chain network and displayed on a supply chain network node device, a user to request a supply chain operation for delivery of at least one item from a first supply chain network node to a second supply chain network node associated with a first supply chain network;

enable, via the customer user interface, the user to select a delivery date and a time window for the delivery of the at least one item, wherein the server device is configured to provide one or more available delivery dates and time windows for selection that are determined in real-time based on the acquired data associated with each of the plurality of supply chain networks and the at least one item received in the user request;

identify at least one consolidation center from the one or more determined number of consolidation centers to receive the at least one item in the user requested supply chain operation from the first supply chain network node, wherein the at least one consolidation center is identified based on the location of the first supply chain network node and the second supply chain network node, availability of the at least one user requested item and the selected delivery date and time window and is configured to store items and process supply chain operations associated with at least one other supply chain network different from the user requested first supply chain network;

generate a map for the user requested supply chain operation based on the location of the first supply chain network node, the second supply chain network node and the identified at least one consolidation center, the generated map including one or more traffic zones within a geographic region associated with the user requested supply chain operation;

determine a delivery route, within the generated map, for delivering the at least one item from the first supply chain network node to the second supply chain network node via the identified at least one consolidation center;

transmit the determined delivery route to at least one final mile delivery vehicle to deliver the at least one item of the user requested supply chain operation from the at least one consolidation center via the determined delivery route to the second supply chain network node;

receive, from the at least one final mile delivery vehicle, real time location data obtained from a GPS system using a GPS module in the at least one final mile delivery vehicle, and real time data associated with local traffic attributes for the geographic region;

generate a refined map by updating the one or more traffic zones in real time based on the real-time location data from the GPS system that is associated with the local traffic attributes;

determine, using the real-time location data from the GPS system, a refined delivery route within the refined map and based on the real time location of the final mile delivery vehicle; and transmit the refined delivery route to the at least one final mile delivery vehicle to deliver the at least one item in the user requested supply chain operation to the second supply chain network node.

2. The system of claim 1, further comprising a mobile client application connected to the server device to enable drivers to coordinate between shipment hubs and delivery nodes of the supply chain networks.

3. The system of claim 1, further comprising a logistics database communicating with the server device, wherein the server device is further configured to store the data acquired over time in the logistics database to determine the numbers and locations for the consolidation centers.

4. The system of claim 3, wherein the system provides access to the logistics database to third parties to enable optimizing geographic placement of assets, fleet sizes, and/or personnel deployment.

5. The system of claim 1, wherein for processing the user requested supply chain operation, the server device is further configured to determine a prior date for the first supply chain network node to transport the at least one item to the at least one consolidation center included in the determined delivery route, the prior date being determined based at least on the selected delivery date and an estimated transit time between the first supply chain network node and the second supply chain network node via the at least one consolidation center.

6. The system of claim 1, wherein each of the plurality of supply chain networks includes their respective supply chain resources for transporting items among their respective one or more supply chain network nodes, and wherein the server device is configured to:

acquire data associated with each of the one or more supply chain resources of each of the plurality of supply chain networks;

identify one or more supply chain resources associated with a second supply chain network, different from the first supply chain network, having excess capacities to process the consumer requested supply chain operation; and allocate the identified one or more supply chain resources, having excess capacities, associated with the second supply chain network to transport the at least one item from one or more of the first supply chain network node of the first supply chain network to the determined at least one consolidation center or from the determined at least one consolidation center to the second supply chain network node of the first supply chain network.

7. The system of claim 1, wherein the server device is further configured to generate a centralized catalogue including one or more of products, descriptions, available quantities, and multimedia for each of the vendor nodes associated with each of the supply chain networks, the centralized catalogue being updated in real-time and wherein the server device is configured to provide the one or more delivery dates and time windows based on the data of the centralized catalogue.

8. A method for integrating a plurality of supply chain networks, each of the plurality of supply chain networks including a plurality of supply chain network nodes having at least one vendor node, at least one retailer node, and at least one consumer node, the method comprising:

acquiring, by a server device, data associated with each of the plurality of supply chain networks, the data including at least a location of each of the supply chain network nodes associated with each of the plurality of supply chain networks, wherein the server device is interfaced with a plurality of consolidation centers and communicatively connected to each of the supply chain network nodes of the plurality of supply chain networks via respective application programming interfaces (APIs), and wherein each of the plurality of consolidation centers are separate from each of the plurality of supply chain networks;

determining, by the server device, a number of consolidation centers from the plurality of consolidation centers, and location for each of the number of consolidation centers based on the acquired data, each of the determined number of the consolidation centers being configured to be shared among the plurality of supply chain networks for storing one or more items to be transported to and from the plurality of supply chain network nodes associated with the plurality of supply chain networks, wherein the number and location of consolidation centers is continually refined based on the acquired data;

enabling, by the server device via a customer user interface provided by a first supply chain network and displayed on a supply chain network node device, a user to request a supply chain operation for delivery of at least one item from a first supply chain network node to a second supply chain network node associated with a first supply chain network;

enabling, by the server device via the customer user interface, the user to select a delivery date and a time window for the delivery of the at least one item, wherein one or more available delivery dates and time windows are provided, by the server device, for selection that are determined in real-time based on the acquired data associated with each of the plurality of supply chain networks and the at least one item received in the user request;

identifying, by the server device, at least one consolidation center from the one or more determined number of consolidation centers to receive the at least one item in the user requested supply chain operation from the first supply chain network node, wherein the at least one consolidation center is identified based on the location of the first supply chain network node and the second supply chain network node, availability of the at least one user requested item and the selected delivery date and time window and is configured to store items and process supply chain operations associated with at least one other supply chain network different from the user requested first supply chain network;

generating, by the server device, a map for the user requested supply chain operation based on the location of the first supply chain network node, the second supply chain network node and the identified at least one consolidation center, the generated map including one or more traffic zones within a geographic region associated with the user requested supply chain operation;

determining, by the server device, a delivery route, within the generated map, for delivering the at least one item from the first supply chain network node to the second supply chain network node via the identified consolidation center;

transmitting, by the server device, the determined delivery route to at least one final mile delivery vehicle to deliver the at least one item of the user requested supply chain operation from the at least one consolidation center via the determined delivery route to the second supply chain network node;

receiving, from the at least one final mile delivery vehicle, real time location data obtained from a GPS system using a GPS module in the at least one final mile delivery vehicle, and real time data associated with local traffic attributes for the geographic region;

generating a refined map by updating the one or more traffic zones in real time based on the real-time location data from the GPS system that is associated with the local traffic attributes;

determining, using the real-time location data from the GPS system, a refined delivery route within the refined map and based on the real time location of the final mile delivery vehicle; and transmitting, by the server device, the refined delivery route to the at least one final mile delivery vehicle to deliver the at least one item in the user requested supply chain operation to the second supply chain network node.

9. The method of claim 8, further comprising providing a mobile client application connected to the server device to enable drivers to coordinate between shipment hubs and delivery nodes.

10. The method of claim 8, further comprising storing data acquired by the server device over time in a logistics database; and determining the numbers and locations for the consolidation centers based on the stored data.

11. The method of claim 10, further comprising providing access to the logistics database to third parties to enable optimizing geographic placement of assets, fleet sizes, and/or personnel deployment.

12. The method of claim 8, further comprising using the interfaces to coordinate reverse logistics to facilitate the flow of goods from a consumer or store back to a network node in one of the supply chain networks.

13. The method of claim 8, further comprising receiving a request to cancel or add an item or reschedule a delivery time; and generating a new or modified delivery route to process the request.

14. The method of claim 8, further comprising implementing a staging and picking process for a warehouse, via a corresponding one of the interfaces.

15. The method of claim 8, further comprising enabling cross-docking via a corresponding one of the interfaces.

16. The method of claim 8, wherein processing the user requested supply chain operation further comprising determining, by the server device, a prior date for the first supply chain network node to transport the at least one item to the at least one consolidation center included in the determined delivery route, the prior date being determined based at least on the selected delivery date and an estimated transit time between the first supply chain network node and the second supply chain network node via the at least one consolidation center.

17. The method of claim 8, wherein each of the plurality of supply chain networks includes their respective supply chain resources for moving items among the one or more supply chain network nodes within the respective supply chain network, and wherein the method further comprising:

acquiring, by the server device, data associated with each of the one or more supply chain resources of each of the plurality of supply chain networks;

identifying, by the server device, one or more supply chain resources associated with a second supply chain network, different from the first supply chain network, having excess capacities to process the consumer requested supply chain operation; and allocating, by the server device, the identified one or more supply chain resources, having excess capacities, associated with the second supply chain network to transport the at least one item from one or more of the first supply chain network node of the first supply chain network to the determined at least one consolidation center or from the determined at least one consolidation center to the second supply chain network node of the first supply chain network.

18. The method of claim 8 further comprising generating, by the server device, a centralized catalogue including one or more of products, descriptions, available quantities, and multimedia for each of the vendor nodes associated with each of the supply chain networks, the centralized catalogue being updated in real-time and wherein the one or more delivery dates and time windows are provided, by the server device, based on the data of the centralized catalogue.

19. A non-transitory computer readable medium comprising computer executable instructions for integrating a plurality of supply chain networks, each of the plurality of supply chain networks including a plurality of supply chain network nodes comprising at least one vendor node, at least one retailer node, and at least one consumer node, the non-transitory computer readable medium comprising computer executable instructions for:

acquiring, by a server device, data associated with each of the plurality of supply chain networks, the data including at least a location of each of the supply chain network nodes associated with each of the plurality of supply chain networks, wherein the server device is interfaced with a plurality of consolidation centers and communicatively connected to each of the supply chain network nodes of the plurality of supply chain networks via respective application programming interfaces (APIs), and wherein each of the plurality of consolidation centers are separate from each of the plurality of supply chain networks;

determining, by the server device, a number of consolidation centers from the plurality of consolidation centers, and location for each of the number of consolidation centers based on the acquired data, each of the determined number of the consolidation centers being configured to be shared among the plurality of supply chain networks for storing one or more items to be transported to and from the plurality of supply chain network nodes associated with the plurality of supply chain networks, wherein the number and location of consolidation centers is continually refined based on the acquired data;

enabling, by the server device via a customer user interface provided by a first supply chain network and displayed on a supply chain network node device, a user to request a supply chain operation for delivery of at least one item from a first supply chain network node to a second supply chain network node associated with a first supply chain network;

enabling, by the server device via the customer user interface, the user to select a delivery date and a time window for the delivery of the at least one item, wherein one or more available delivery dates and time windows are provided, by the server device, for selection that are determined in real-time based on the acquired data associated with each of the plurality of supply chain networks and the at least one item received in the user request;

identifying, by the server device, at least one consolidation center from the one or more determined number of consolidation centers to receive the at least one item in the user requested supply chain operation from the first supply chain network node, wherein the at least one consolidation center is identified based on the location of the first supply chain network node and the second supply chain network node, availability of the at least one user requested item and the selected delivery date and time window and is configured to store items and process supply chain operations associated with at least one other supply chain network different from the user requested first supply chain network;

generating, by the server device, a map for the user requested supply chain operation based on the location of the first supply chain network node, the second supply chain network node and the identified at least one consolidation center, the generated map including one or more traffic zones within a geographic region associated with the user requested supply chain operation;

determining, by the server device, a delivery route, within the generated map, for delivering the at least one item from the first supply chain network node to the second supply chain network node via the identified consolidation center;

transmitting, by the server device, the determined delivery route to at least one final mile delivery vehicle to deliver the at least one item of the user requested supply chain operation from the at least one consolidation center via the determined delivery route to the second supply chain network node;

receiving, from the at least one final mile delivery vehicle, real time location data obtained from a GPS system using a GPS module in the at least one final mile delivery vehicle, and real time data associated with local traffic attributes for the geographic region;

generating a refined map by updating the one or more traffic zones in real time based on the real-time location data from the GPS system that is associated with the local traffic attributes;

determining, using the real-time location data from the GPS system, a refined delivery route within the refined map and based on the real time location of the final mile delivery vehicle; and transmitting, by the server device, the refined delivery route to the at least one final mile delivery vehicle to deliver the at least one item in the user requested supply chain operation to the second supply chain network node, wherein processing the user requested supply chain operation further comprising determining, by the server device, a prior date for the first supply chain network node to transport the at least one item to the at least one consolidation center included in the determined delivery route, the prior date being determined based at least on the selected delivery date and an estimated transit time between the first supply chain network node and the second supply chain network node via the at least one consolidation center.

20. The non-transitory computer readable medium of claim 19, wherein each of the plurality of supply chain networks includes their respective supply chain resources for moving items among the one or more supply chain network nodes within the respective supply chain network, and wherein the method further comprising:

acquiring, by the server device, data associated with each of the one or more supply chain resources of each of the plurality of supply chain networks;

identifying, by the server device, one or more supply chain resources associated with a second supply chain network, different from the first supply chain network, having excess capacities to process the consumer requested supply chain operation; and allocating, by the server device, the identified one or more supply chain resources, having excess capacities, associated with the second supply chain network to transport the at least one item from one or more of the first supply chain network node of the first supply chain network to the determined at least one consolidation center or from the determined at least one consolidation center to the second supply chain network node of the first supply chain network.

\* \* \* \* \*